US012185145B2

(12) United States Patent
Siomina et al.

(10) Patent No.: US 12,185,145 B2
(45) Date of Patent: Dec. 31, 2024

(54) METHODS AND NETWORK NODES FOR CONFIGURING ALMOST BLANK SUBFRAME TRANSMISSION PATTERNS AND CORRESPONDING MEASUREMENT PATTERNS FOR REDUCING INTERCELL INTERFERENCE IN AN HETEROGENEOUS CELLULAR RADIO COMMUNICATION SYSTEM

(71) Applicant: Telefonaktiebolaget LM Ericsson (publ), Stockholm (SE)

(72) Inventors: Iana Siomina, Täby (SE); Elena Myhre, Järfälla (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 1093 days.

(21) Appl. No.: 15/403,231

(22) Filed: Jan. 11, 2017

(65) Prior Publication Data
US 2017/0127309 A1 May 4, 2017

Related U.S. Application Data

(63) Continuation of application No. 13/883,839, filed as application No. PCT/SE2011/051333 on Nov. 8, 2011, now Pat. No. 9,560,662.
(Continued)

(51) Int. Cl.
*H04W 24/10* (2009.01)
*H04W 72/541* (2023.01)
(Continued)

(52) U.S. Cl.
CPC ......... *H04W 24/10* (2013.01); *H04W 72/541* (2023.01); *H04W 72/51* (2023.01); *H04W 84/045* (2013.01)

(58) Field of Classification Search
CPC . H04W 24/10; H04W 72/082; H04W 72/048; H04W 84/045
See application file for complete search history.

(56) References Cited

U.S. PATENT DOCUMENTS 8,238,895 B2   8/2012   Sorbara et al.
8,345,620 B2   1/2013   Chen et al.
(Continued)

FOREIGN PATENT DOCUMENTS

CN        1939002 A       3/2007
CN      101606346 A     12/2009
(Continued)

OTHER PUBLICATIONS

Alcatel-Lucent, "RRC signalling design for Almost Blank Subframe patterns", Uploaded Nov. 9, 2010, 3GPP TSG-RAN WG2, R2-106451. (Year: 2010).*
(Continued)

*Primary Examiner* — Peter P Chau
(74) *Attorney, Agent, or Firm* — COATS & BENNETT, PLLC

(57) ABSTRACT

A method and a network node for enabling configuration of at least two patterns for a cell are provided. The patterns are transmission patterns or measurement patterns. The network node obtains the at least two patterns. Each of the at least two patterns is associated with information about a respective restricted area such that each pattern is used when a user equipment served by the cell is located in the respective restricted area. Each respective restricted area is smaller than an entire area of the cell. Moreover, a method and a user equipment for configuring measurements are provided. The user equipment is served by a cell of a radio base station. The user equipment receives at least two measurement patterns from the radio base station. Each measurement pattern is associated with a respective restricted area. Each
(Continued)

respective restricted area is smaller than an entire area of the cell. The user equipment obtains information about the respective restricted area.

17 Claims, 8 Drawing Sheets

Related U.S. Application Data

(60) Provisional application No. 61/412,601, filed on Nov. 11, 2010.

(51) Int. Cl.
*H04W 72/51* (2023.01)
*H04W 84/04* (2009.01)

(56) References Cited

U.S. PATENT DOCUMENTS

| | | | |
|---|---|---|---|
| 9,461,859 B2 | 10/2016 | Gorokhov et al. | |
| 2004/0176671 A1 | 9/2004 | Fine et al. | |
| 2005/0096062 A1* | 5/2005 | Ji | H04W 16/02 455/450 |
| 2009/0232062 A1* | 9/2009 | Higuchi | H04L 5/0092 370/329 |
| 2009/0257390 A1* | 10/2009 | Ji | H04W 72/082 370/329 |
| 2010/0199046 A1 | 8/2010 | Weiberle et al. | |
| 2010/0296459 A1* | 11/2010 | Miki | H04L 5/0007 370/329 |
| 2011/0051684 A1 | 3/2011 | Li et al. | |
| 2011/0196515 A1 | 8/2011 | Niki et al. | |
| 2011/0218737 A1 | 9/2011 | Gulati | |
| 2012/0113843 A1* | 5/2012 | Watfa | H04W 72/1289 370/252 |
| 2012/0113844 A1* | 5/2012 | Krishnamurthy | H04L 1/0026 370/252 |
| 2012/0202490 A1* | 8/2012 | Szufarska | H04W 24/10 455/434 |
| 2013/0223271 A1* | 8/2013 | Huang | H04W 48/16 370/252 |
| 2013/0229940 A1* | 9/2013 | Baker | H04W 24/02 370/252 |
| 2013/0329636 A1* | 12/2013 | Jiang | H04W 48/16 370/328 |

FOREIGN PATENT DOCUMENTS

| | | |
|---|---|---|
| JP | 2007022469 A | 2/2007 |
| RU | 2008121202 A | 12/2009 |
| WO | 2009129261 A1 | 10/2009 |
| WO | 2010107260 A2 | 9/2010 |

OTHER PUBLICATIONS

Alcatel-Lucent, "Need for multiple ABS patterns for CQI measurements", Uploaded Nov. 9, 2010, 3GPP TSG-RAN WG2, R2-106453. (Year: 2010).*

Nokia Siemens Networks (Rapporteur), "System Information, Mobility, QoS and miscellaneous updates", 3GPP TSG-RAN2 Meeting #62, May 5-9, 2008, pp. 1-21, Kansas City, US, R2-082866.

3rd Generation Partnship Project, "Technical Specification Group Radio Access Network; Evolved Universal Terrestrial Radio Access (E-UTRA); FDD Home eNode B (HeNB) Radio Frequency (RF) requirements analysis (Release 9)", Mar. 2010, pp. 1-46.

Alcatel-Lucent, "Signalling support for Almost Blank Subframe patterns", 3GPP TSG-RAN WG2 Meeting #72, Nov. 15-19, 2010, pp. 1-5, Jacksonville, US, R2-106449.

3rd Generation Partnership Project, "3rd Generation Partnership Project; Technical Specification Group Radio Access Network; Evolved Universal Terrestrial Radio Access (E-UTRA); Physical Channels and Modulation (Release 9)", Technical Specification, 3GPP TS 36.211 V9.1.0, Mar. 2010, pp. 1-85, 3GPP.

* cited by examiner

METHODS AND NETWORK NODES FOR CONFIGURING ALMOST BLANK SUBFRAME TRANSMISSION PATTERNS AND CORRESPONDING MEASUREMENT PATTERNS FOR REDUCING INTERCELL INTERFERENCE IN AN HETEROGENEOUS CELLULAR RADIO COMMUNICATION SYSTEM

RELATED APPLICATIONS

The present application is a continuation of U.S. patent application Ser. No. 13/883,839, which was filed on May 7, 2013, which is a national stage application of PCT/SE2011/051333, filed Nov. 8, 2011, and claims benefit of U.S. Provisional Application 61/412,601, filed Nov. 11, 2010, the disclosures of each of which are incorporated herein by reference in their entirety.

TECHNICAL FIELD

Embodiments herein relate to a method in a network node and a network node for enabling configuration of at least two patterns for a cell. Furthermore, embodiments herein relate to a method in a user equipment and a user equipment for configuring measurements

BACKGROUND

The interest in deploying low-power nodes, such as pico base stations, home radio base stations (home eNodeBs), relays, remote radio heads and the like, in a network has constantly increased over the last few years. When a network employs low-power nodes in addition to regular base stations, the network is usually referred to as a heterogeneous network. The regular base stations are often referred to as a macro layer and the low-power nodes are often referred to as a pico layer. A purpose of employing low-power nodes is to enhance performance of the macro layer in terms of network coverage, capacity and service experience of individual users.

At the same time as interest for low-power nodes has grown, it has been realized that there is a need for enhanced interference management techniques to address the arising interference issues caused by, for example, a significant transmit power variation among different cells. Cell association techniques are also needed for more uniform networks.

In the Third Generation Partnership Project (3GPP), heterogeneous network deployments have been defined as deployments where low-power nodes of different transmit powers are placed throughout a macro-cell layout, implying non-uniform traffic distribution. Such deployments are, for example, effective for capacity extension in certain areas. These areas may include so-called traffic hotspots, i.e. small geographical areas with higher user density and/or higher traffic intensity. Installation of low-power nodes, such as pico nodes, in these areas can enhance performance. Heterogeneous deployments may also be viewed as a way of densifying, or concentrating, networks to adopt for the traffic needs and the environment. However, heterogeneous deployments also bring challenges for which the network has to be prepared in order to ensure efficient network operation and superior user experience. Therefore, different interference management techniques, or interference management procedures, have been proposed.

One example of such interference management procedure relates to interference management for heterogeneous deployments. To ensure reliable and high-bitrate transmissions as well as robust control channel performance, maintaining a good signal quality is a must in wireless networks. The signal quality is determined by the received signal strength and its relation to the total interference and noise received by the receiver. A good network plan, e.g. good cell planning, is a prerequisite for successful network operation, but the cell planning is static. For more efficient radio resource utilization, the network plan has to be complemented by semi-static and dynamic radio resource management mechanisms. These mechanisms are intended to facilitate interference management and deploy more advanced antenna technologies and algorithms.

One way to handle interference is to utilize more advanced transceiver technologies, e.g. by implementing interference cancellation mechanisms in terminals, or user equipments (UEs). Another way, which can be complementary to the former, is to design efficient interference coordination algorithms, such as inter-cell interference coordination (ICIC) and transmission schemes in the network.

Inter-cell interference coordination (ICIC) methods for coordinating data transmissions between cells have been specified in Long Term Evolution (LTE) release 8. In LTE release 8, the exchange of ICIC information between cells in LTE is carried out via an X2 interface by means of the X2-Application Protocol (X2-AP protocol). The X2 interface and the X2-AP are known from 3GPP terminology. Based on this information, the network can dynamically coordinate data transmissions in different cells in the time-frequency domain and also by means of power control so that the negative impact of inter-cell interference is minimized. With such coordination, base stations may optimize their resource allocation by cells either autonomously or via another network node ensuring centralized or semi-centralized resource coordination in the network. With the current 3GPP specification, such coordination is typically transparent to user equipments.

Two examples of coordinating interference on data channels are illustrated in FIG. 1a and FIG. 1b. In FIGS. 1a-e, subcarriers, i.e. different frequencies, are vertically arranged along a vertical axis and time is expressed along the horizontal direction. Exemplifying data channels are denoted D1, D2, D3 and D4. In the example of FIG. 1a, data transmissions, such as D1, D2, D3 and D4, in two cells are separated in frequency, i.e. the no-data regions D1, D4 do not overlap in the vertical direction. The two cells, such as the pico and the macro, belong to different layers, i.e. macro and pico layers, By contrast, in the example of FIG. 1b, low-interference subframes are created at some time instances, such as at a center subframe of the three subframes shown for the macro, for data transmissions in pico cells by suppressing macro-cell transmissions in these time instances. This may, for example, enhance performance of user equipments which would otherwise experience strong interference from macro cells. For example, this applies to user equipments which are closely located to macro cells, or macro radio base stations. Such coordination mechanisms are possible already with the current specification.

Unlike for data transmission, current specifications limit ICIC possibilities for control channels. For instance, the mechanisms illustrated in FIG. 1a-b are not possible for control channels and are not possible for reference signals measured for mobility.

FIGS. 1c-e illustrate three approaches (1), (2), (3) of enhanced ICIC to handle the interference on control channels.

(1) as in FIG. 1c illustrates use of low-interference subframes in time.

In FIG. 1c, the vertical stripes indicate reduced interference to the control channels in the control region.

(2) as in FIG. 1d illustrates use of time shifts. It is noted that (2) has some limitations for Time Division Duplex (TDD) and is not possible with synchronous network deployments. Moreover, (2) is not efficient at high traffic loads. From the legacy terminal point of view, Cell-Specific Reference Signals (CRS) still need to be transmitted in all subframes, so there will still be inter-cell interference from CRS.

(3) as in FIG. 1e illustrates use of in-band control channel in combination with frequency re-use. In FIG. 1e, the grids indicate reduced interference to the enhanced control channels in the data region.

(1) and (3) require standardization changes whilst (2) is possible with the current standard.

Interference coordination techniques, as illustrated in FIGS. 1a-e, reduce the interference from a strong interferer, e.g. a macro cell, during other-cell, e.g. pico, transmissions. In doing so, the techniques assume that second cells, such as pico cells, are aware about the time-frequency resources with low-interference conditions and thus can prioritize scheduling of transmissions in those subframes for users which potentially may strongly suffer from the interference caused by the strong interferers.

As mentioned above, the possibilities to efficiently mitigate inter-cell interference to and from control channels are limited with the current standard. However, even less flexibility exists for dealing with interference to/from physical signals which typically have a pre-defined static resource allocation in the time-frequency space. In the following, some known techniques for interference cancelation are described.

In signal cancellation techniques, the channel is measured and used to restore the signal from a limited number of strongest interferers. This technique impacts receiver implementation and its complexity. Furthermore, in practice, channel estimation puts a limit on how much signal energy can be subtracted.

In symbol-level time shifting techniques, there is no impact on the standard, but it is not relevant for TDD networks or networks providing the MBMS service. This technique is applicable when a macro base station and a home base station are time-synchronized. This approach uses time shifting of transmission from the home base station relative to downlink frame timing of macro base station and uses power reduction, or muting, by the home base station and/or the macro base station, on the portion of a symbol(s) that overlap the control region of the macro or home base station.

A further technique completely mutes a signal in a subframe. In this technique, CRS are not transmitted at all in some subframes for energy efficiency reasons. This technique was proposed earlier in 3GPP. The technique is not backward compatible to Release 8 and/or 9 user equipments, which expect CRS to be transmitted at least on antenna port 0.

Given a very limited set of possibilities for interference cancelation listed above, there is a strong need for simple but yet efficient new techniques to resolve the CRS interference issue. A similar issue exists, for example, for synchronization and broadcast channels, where time shifts may be utilized to address the issue.

The need for enhanced ICIC techniques is particularly crucial when the cell assignment rule diverges from the Reference Signal Received Power (RSRP) based approach, e.g. towards a pathloss or a 'path gain'-based approach. This is sometimes also referred to as the cell range expansion when adopted for cells with a transmit power lower than neighbor cells. An idea of the cell range expansion is illustrated in FIG. 2, where the cell range expansion of a pico cell is implemented by means of a delta-parameter, aka bias or cell selection offset. The cell range expansion approach is also known as biased cell selection.

As discussed above, different interference coordination techniques, also referred to as enhanced ICIC (eICIC), have been discussed in the context of heterogeneous network deployments.

Now returning to the X2 interface, information to be signaled between radio base stations and from radio base stations, such as eNodeB, to a user equipment (UE) is described. It has been proposed that the signaling shall comprise the following:

one bitmap pattern to indicate an Almost Blank Subframe (ABS) pattern of Macro cell to Pico cell, a second bitmap to indicate a subset of the subframes indicated by the first bitmap, which are recommended to the receiving node for configuration of restricted Radio Link Monitoring (RLM) and/or Radio Resource Management (RRM) measurements, and the pattern length and periodicity: Frequency Division Duplex (FDD)—40 ms; TDD—20 ms for downlink and/or uplink (DL/UL) configuration 1~5, 70 ms for DL/UL configuration 0, 60 ms for DL/UL configuration 6.

It is also proposed that the requested Radio Resource Control (RRC) signaling comprises RRC signaling for resource specific RLM/RRM measurements and Channel State Information (CSI) measurements, where the resources that can be used for measurements are indicated by patterns, such as an ABS pattern or a pattern for RRM/RLM. A definition of ABS subframes is described in the following. For an ABS subframe, user equipments may assume the following:

All ABS subframes carry CRS;

If Primary Synchronization Signal (PSS), Secondary Synchronization Signal (SSS), Physical Broadcast Channel (PBCH), System Information Block 1 (SIB1), Paging and/or Positioning Reference Signals (PRS) coincide with an ABS, they are transmitted in the ABS (with associated PDCCH when SIB1/Paging is transmitted);

Needed for legacy support;

CSI reference signals (CSI-RS) transmission on ABS is not determined yet;

No other signals are transmitted in ABSs;

If ABS coincides with Multicast Broadcast Single Frequency Network (MBSFN) subframe not carrying any signal in data region, CRS is not present in data region;

MBSFN subframe carrying signal in data region shall not be configured as ABS.

According to the current state of the art, a measurement pattern per cell is to be decided. The measurement pattern is determined by a bitmap which is signaled to the user equipment, and it does not have to be the same as the transmission pattern.

In a scenario, where load varies significantly among cells, it is expected that different ABS patterns are configured in different cells. When determining the measurement pattern, the different ABS patterns will need to be taken into account. Thus, only a small set of resources may be available for measurements. As a result, measurement quality may degrade and measurement time may increase.

Moreover, according to the current state of the art, a transmission pattern, or a ABS pattern, may be signaled to a neighbor radio node. The transmission pattern is determined by another bitmap.

With reference to the above mentioned scenario, the ABS pattern puts limitation on the network performance, in particular in terms what measurement pattern can be used.

SUMMARY

An object with embodiments herein is to improve performance of a radio communication system, such as a radio communication system based on LTE.

According to an aspect, the object is achieved by a method in a network node for enabling configuration of at least two patterns for a cell. The patterns are transmission patterns or measurement patterns. The network node obtains the at least two patterns. Each of the at least two patterns is associated with a respective restricted area such that each pattern is used when a user equipment served by the cell is located in the respective restricted area. Each respective restricted area is smaller than an entire area of the cell.

According to another aspect, the object is achieved by a network node for enabling configuration of at least two patterns for a cell. The patterns are transmission patterns or measurement patterns. The network node comprises a processing circuit configured to obtain the at least two patterns. Each of the at least two patterns is associated with a respective restricted area such that each pattern is used when a user equipment served by the cell is located in the respective restricted area. Each respective restricted area is smaller than an entire area of the cell.

According to a further aspect, the object is achieved by a method in a user equipment for configuring measurements. The user equipment is served by a cell of a radio base station. The user equipment receives at least two measurement patterns from the radio base station. Each measurement pattern is associated with a respective restricted area such that each measurement pattern is used when the user equipment is located in the respective restricted area. Each respective restricted area is smaller than an entire area of the cell. Furthermore, the user equipment obtains information about the respective restricted area, thereby configuring measurements.

According to yet another aspect, the object is achieved by a user equipment for configuring measurements. The user equipment is configured to be served by a cell of a radio base station. The user equipment comprises a receiver configured to receive at least two measurement patterns from the radio base station. Each measurement pattern is associated with a respective restricted area such that each measurement pattern is used when the user equipment is located in the respective restricted area. Each respective restricted area is smaller than an entire area of the cell. The user equipment further comprises a processing circuit configured to obtain information about the respective restricted area. In this manner, the user equipment is configured for configuring measurements.

Thanks to that at least two patterns can be configured for at least two respective restricted areas, a first pattern is usable for a first restricted area and a second pattern is usable for a second restricted area.

When the patterns are transmission patterns, the first pattern allows for transmission in a larger number of frames than a number of frames allowed for transmission as defined by the second pattern. A larger number of frames provides a larger number of transmission occasions. This means that it is easier to find a frame for performing transmission when the number of frames for transmission is larger.

When the patterns are measurement patterns, the first pattern allows for measurement in a larger number of frames than a number of frames allowed for measurement as defined by the second pattern. A larger number of frames provides a larger number of measurement occasions. This means that it is easier to find a frame for performing the measurement when the number of frames for measurements is larger.

Therefore, performance of the radio communication system, when using the second pattern, may be improved as compared to when using the first pattern.

An advantage of embodiments herein is that they provide, for example, less strict measurement configuration for user equipments. This makes it more adaptive to the environment, interference and load conditions within a cell, or different user equipment groups. The embodiments further provide more flexible configuration for macro cells. This permits different patterns in different cells, which in turn significantly enhances macro cell performance compared to the case when the same measurement pattern is used over one cell, a set of neighboring cells, or all cells in a tracking area or the entire network.

A further advantage of embodiments herein is that they provide radio base stations that are aware of the pattern configuration in neighboring cells and/or nodes. Further, embodiments enable communicating patterns with either a pre-defined or a signaled description of at least one of the restricted area where the pattern applies.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Figure 1A:
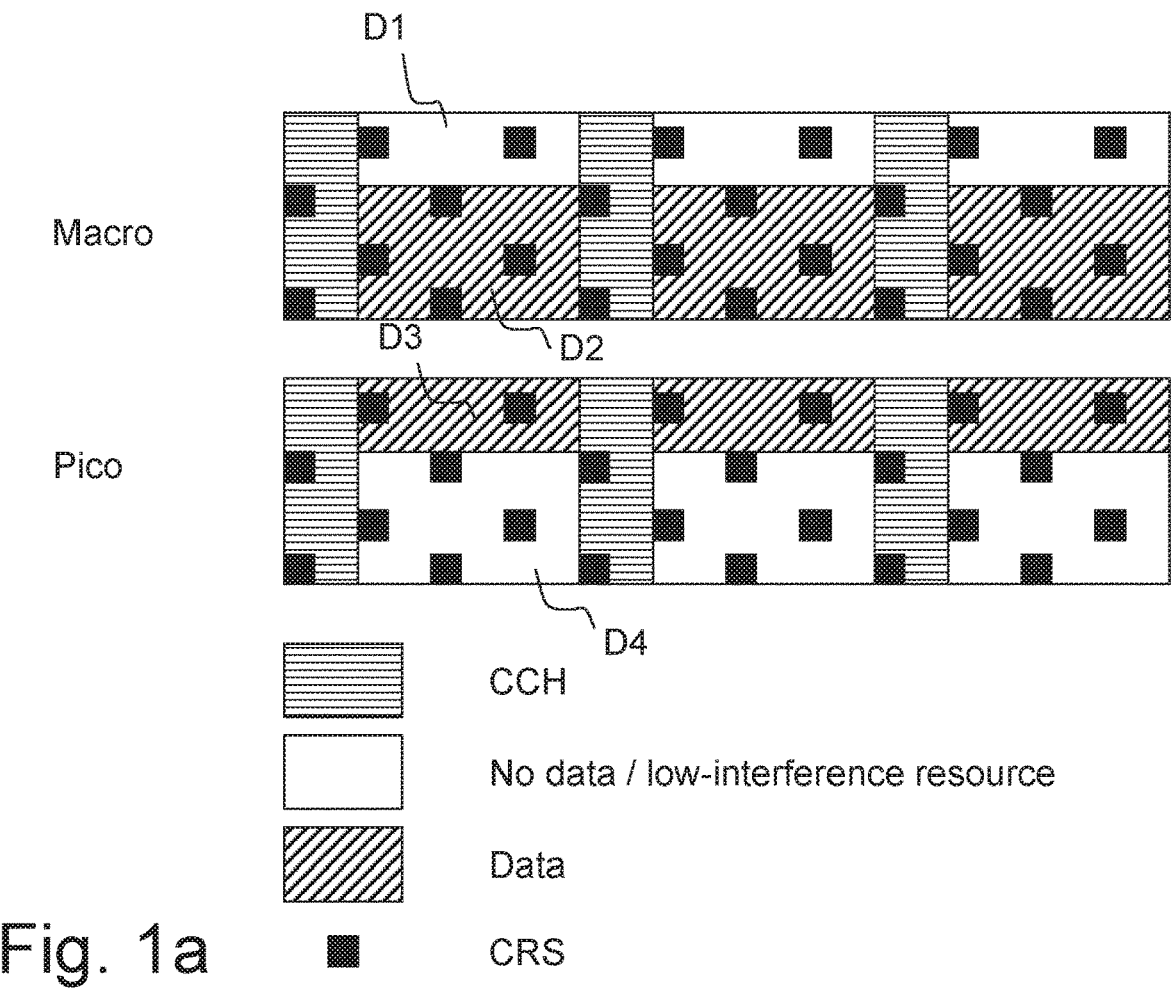
FIG. 1a-e show schematic ICIC schemes.
Figure 1B:
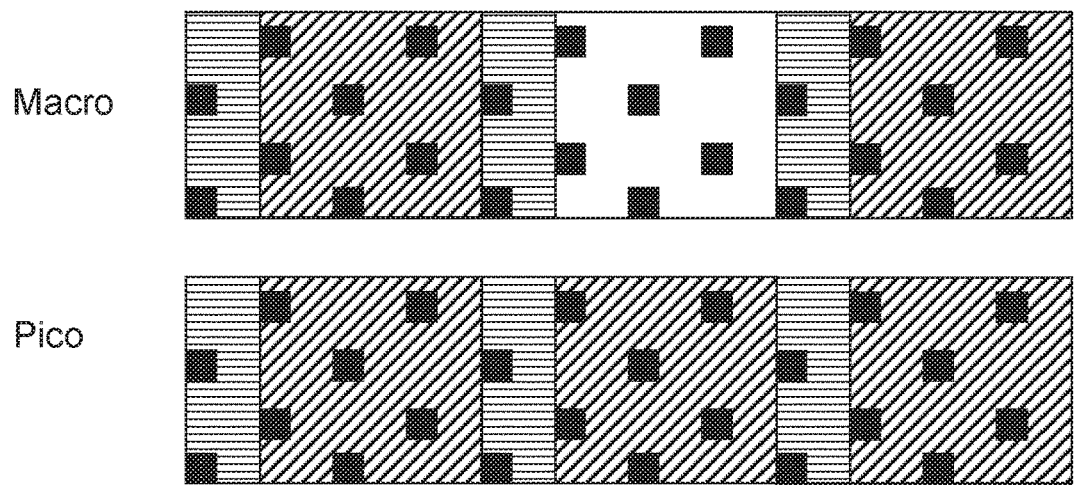
Figure 1C:
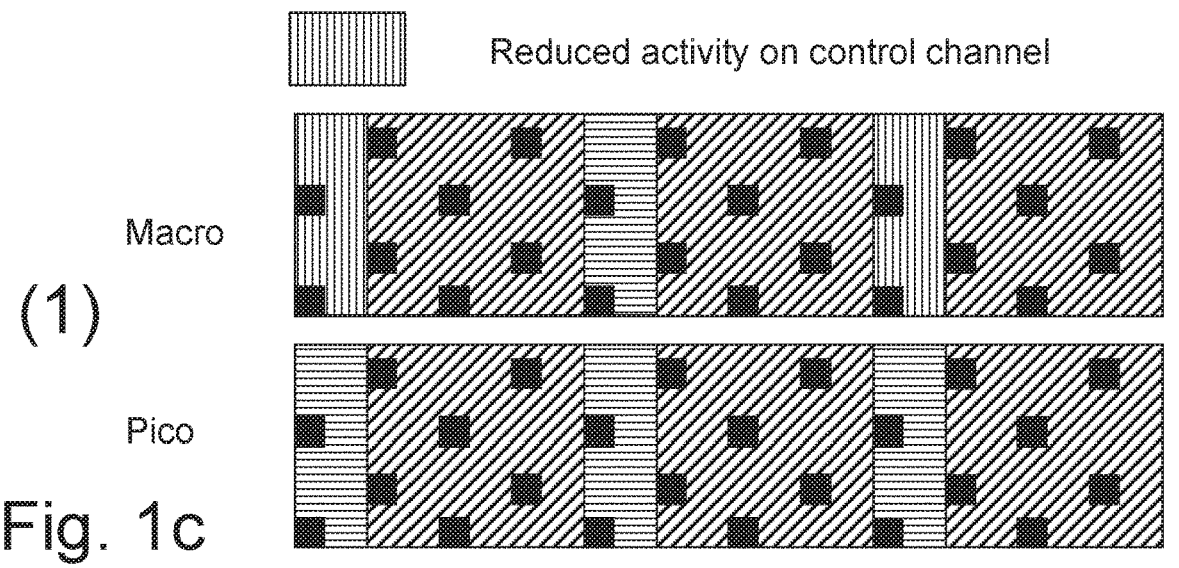
Figure 1D:
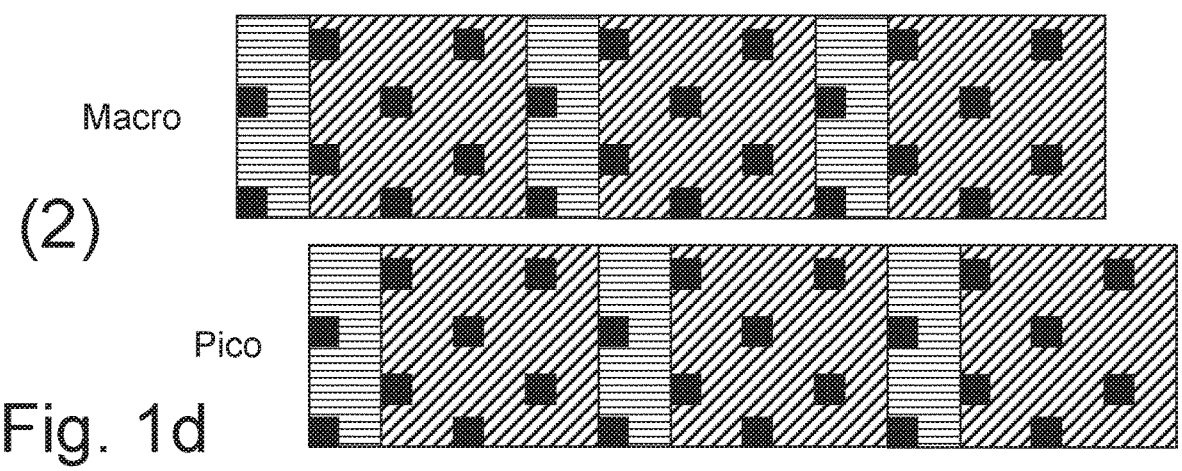
Figure 1E:
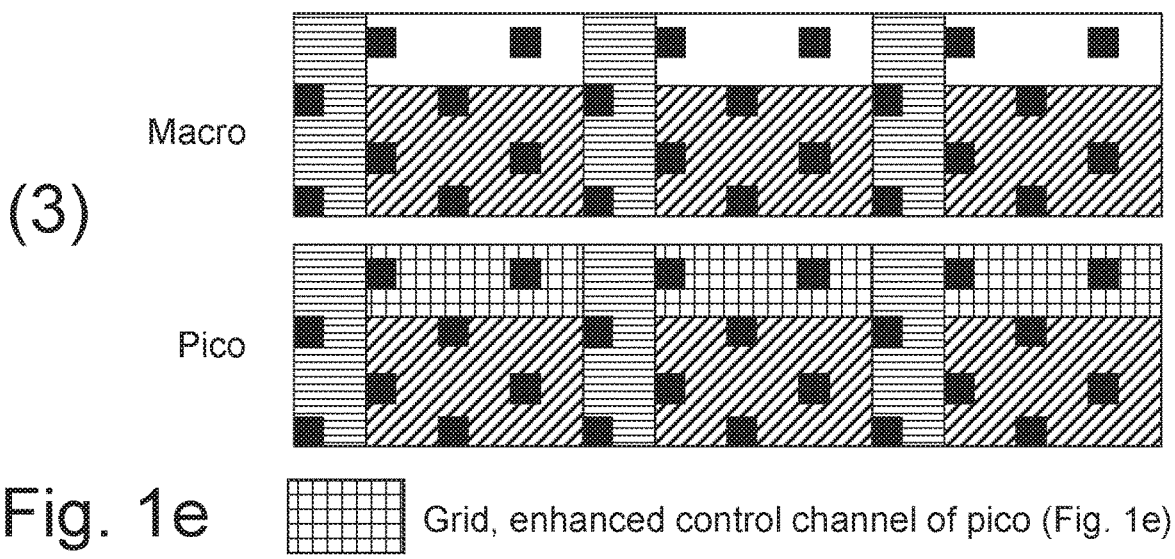
Figure 2:
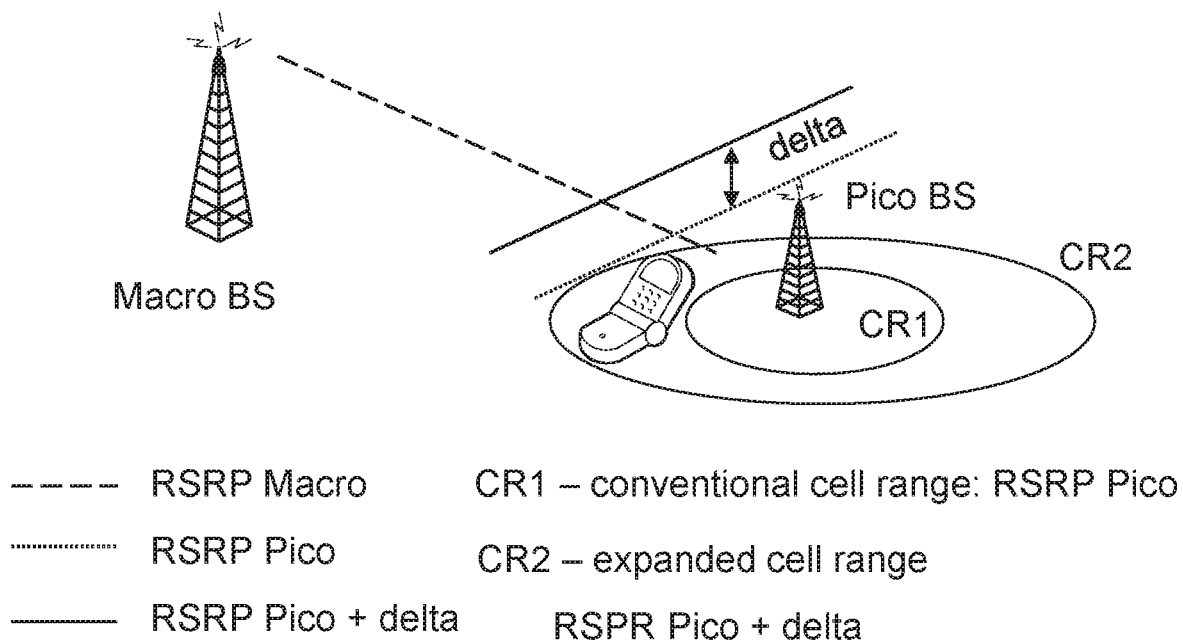
FIG. 2 shows a schematic overview illustrating cell range expansion.

Throughout the following description similar reference numerals have been used to denote similar elements, network nodes, parts, items or features, when applicable. In the Figures, features that appear in some embodiments are indicated by dashed lines.

Figure 3:
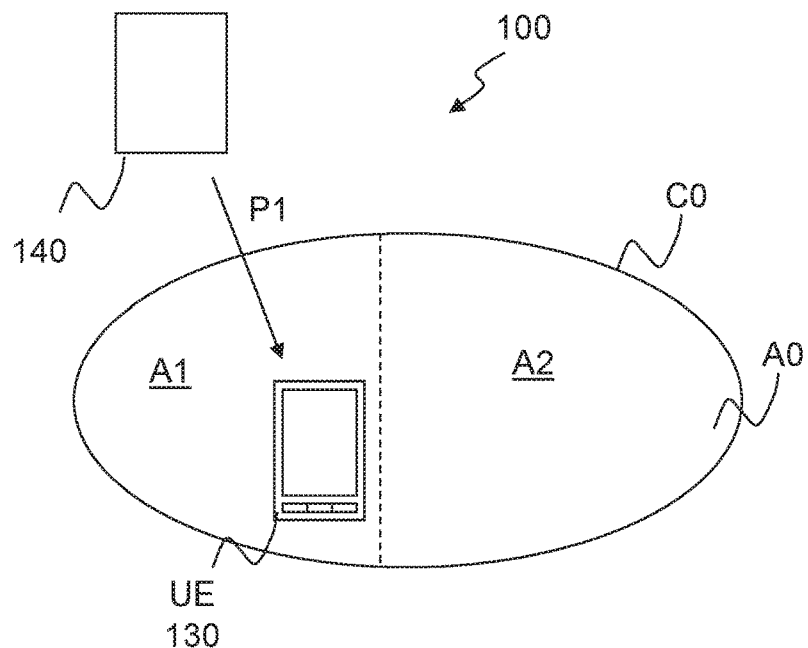
FIG. 3 shows a schematic overview of an exemplifying radio communication system in which exemplifying methods according to embodiments herein may be implemented.

FIG. 3 shows an exemplifying radio communication system 100, which in this example is an LTE system. In other examples, the radio communication system may be based on Global System for Mobile communication (GSM), Universal Mobile Telecommunications System (UMTS), Code Division Multiple Access (CDMA) or the like.

The radio communication system 100 comprises a network node 140. The network node 140 may be a radio base station, a coordinating node, an Operations & Maintenance (O&M) system or the like. In embodiments, where the network node 140 is a radio base station, it may be a macro eNodeB, pico eNodeB, micro eNodeB, home eNodeB, relay node, or the like.

The radio communication system 100 comprises cells, such as a cell C0 in FIG. 3. The cell C0 is operated by a radio base station, such as the network node 140. Thus, the radio communication system 100 may depict a classical deployment, i.e. there are no pico radio base stations or the like. Embodiments herein may also be implemented in a macro/pico deployment, also referred to as a heterogeneous deployment, which is described below and shown in FIG. 5.

At least two patterns may be configured for the cell C0. The at least two patterns are transmission patterns or measurement patterns. The patterns indicate subframes available for transmission or measurement. A subframe is known from 3GPP terminology and has typically a duration of 1 ms. Thus, the at least two patterns may be related to transmission power or transmission activity in the cell C0.

The at least two patterns may comprise a first pattern and a second pattern, respectively. The first and the second patterns are associated with at least one of the following characteristics: bandwidth, transmit power levels, power reduction, and subframe properties. A first value of the at least one characteristic associated with the first pattern is different from a second value of the same characteristic associated with the second pattern.

When the patterns are measurement patterns, the at least two measurement patterns may be different from each other. The first pattern may be intended for measurements with measurement gaps and the second pattern may be intended for measurements without measurement gaps.

In order to enable increased flexibility for configuration of patterns, the cell C0 comprises a first area A1 and a second area A2. In this manner, different patterns may be configured for, or associated with, different respective areas as described in more detail below. For each area A1, A2, there will be assigned a respective pattern. The cell C0 has an entire cell area A0. Each of the first and second areas A1, A2 is smaller than the entire cell area A0. The radio conditions in the first and second areas A1, A2 may differ for different reasons, such as buildings, background noise etc.

The first area may, e.g., be equal to the entire cell area A0. In such case, a pattern for the second area override pattern configuration for the entire cell, i.e. the first area. This may improve backward compatibility.

A user equipment 130 is located within the cell C0. The user equipment 130 is in some figures is referred to as UE 130. The user equipment 130 may be a mobile phone, a cellular phone, a Personal Digital Assistant (PDA) equipped with radio communication capabilities, a smartphone, a tablet PC, a tablet device, a laptop equipped with an internal or external mobile broadband modem, a portable electronic radio communication device or the like. The user equipment 130 may be served by one or more additional cells (not shown).

When the network node 110 is a coordinating node or a O&M system, the user equipment 130 is configured to communicate, as illustrated by an arrow P1, with the network node 110 via a radio base station (not shown) over a radio link when the user equipment 130 is present in the cell C0 served by the radio base station.

When the network node 110 is a radio base station, the user equipment 130 is configured to communicate, as illustrated by the arrow P1, with the radio base station over a radio link when the user equipment 130 is present in the cell C0 served by the radio base station.

Figure 4:
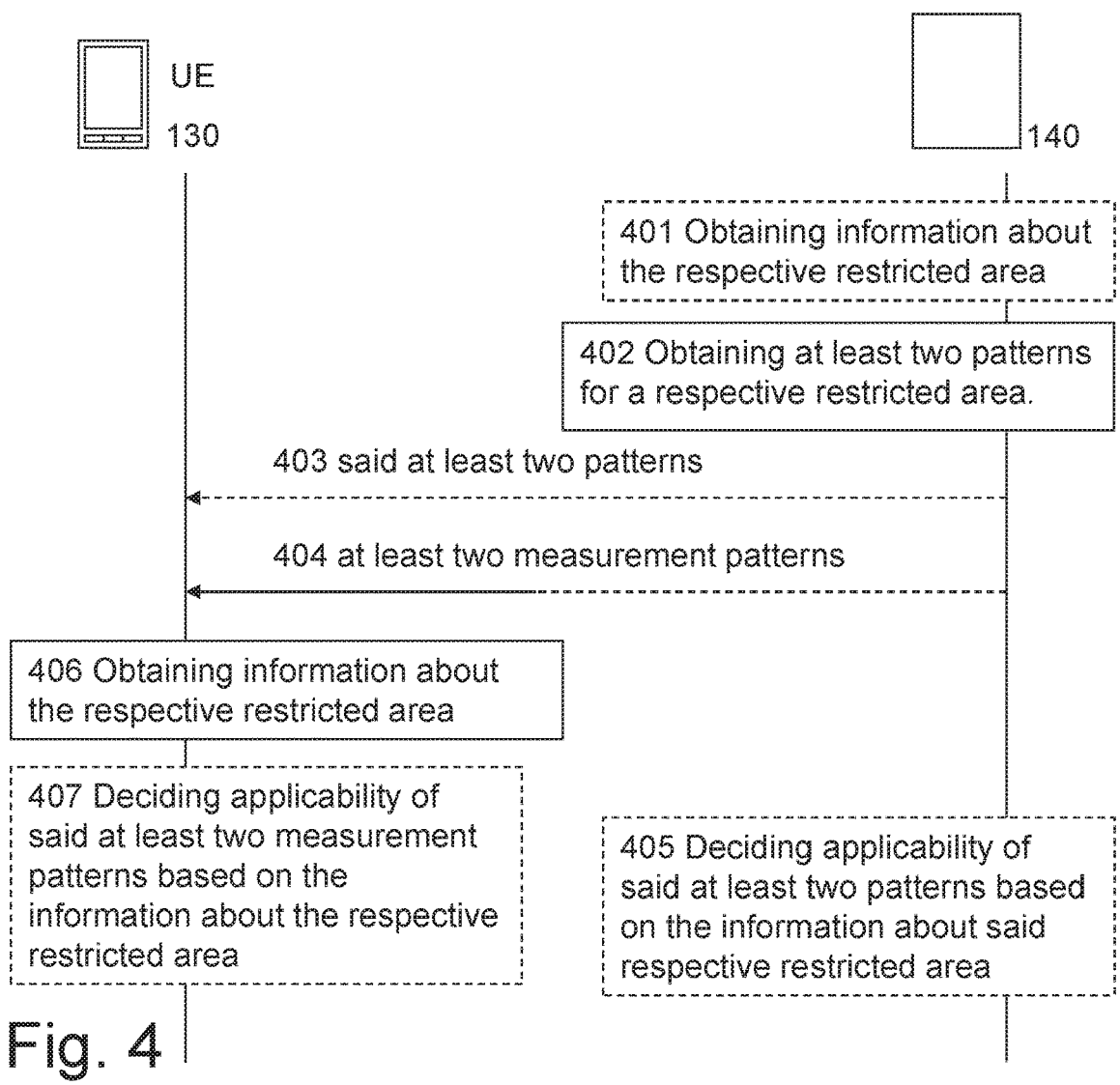
FIG. 4 shows a schematic, combined signaling scheme and flowchart of exemplifying methods performed in the radio communication system according to FIG. 3.

FIG. 4 shows a schematic, combined signaling scheme and flowchart of exemplifying methods performed in the radio communication system according to FIG. 3. The network node 140 performs a method for enabling configuration of the at least two patterns for the cell C0. The user equipment 130 performs a method for configuring measurements.

The following actions may be performed. Notably, in some embodiments of the method the order of the actions may differ from what is indicated below.

Action 401

In some embodiments, the network node 140 obtains information about the respective restricted area, such as the first and second areas A1, A2. As a result, the network node 140 is informed about the respective restricted area.

The information about the respective restricted area may be obtained in one or more of the following manners reading pre-defined information about the respective restricted area, generating the information about the respective restricted area and receiving from another node. The other node may be the coordinating node, the pico or macro radio base station or Operations & Maintenance (O&M) system. These and other examples will be elaborated below in List 2.

As an example, the network node 140 obtains the information about the respective restricted area by generating the respective restricted area based on a detected overlap in coverage area of two neighboring radio base stations.

The information about the respective restricted area will be used in the next action, and may relate to at least one of:
Certain geographical area or direction;
Antenna configuration;
An area with certain radio environment characteristics;
An area defined by a certain user equipment behavior;
An area associated with certain signal strength/quality and user equipment requirements (UE requirements);
An area with certain performance characteristics; and
An area defined by user equipment capabilities or user equipment location (UE capabilities or UE location).

These and other examples will be elaborated below in List 1.

The information about the respective restricted area may be used for interference management, positioning, minimizing drive tests, or SON.

Action 402

In order to allow the network node 140 to enable configuration of the at least two patterns in the cell C0, the network node 140 obtains the at least two patterns.

The obtaining may be performed by generating the at least two patterns or receiving the at least two patterns from another network node.

Each pattern is associated with information about a respective restricted area A1, A2 such that each pattern is used when the user equipment 130 is located in the respective restricted area. Each respective restricted area A1, A2 is smaller than an entire area of the cell C0.

As mentioned above, the at least two patterns comprise the first pattern and the second pattern according to some embodiments. In these embodiments, the obtaining may be performed by generating the first pattern and receiving the second pattern. In this manner, further flexibility for obtaining the at least two patterns is achieved.

Action 403

In some embodiments, the network node 140 further transmits the at least two patterns to a further network node or a user equipment 130. The further node may be a radio base station, serving or not serving the user equipment, or a core network node, such as the coordinating node. Thereby, the further network node or the user equipment may use said at least two patterns for transmission, for measurements or for coordinating purposes.

When the network node 140 is a radio base station, the further network node may be the coordinating node. Thereby, the network node 140 provides information about patterns to the coordinating node, which may use this information to generate further patterns to be applied in other cells. The coordinating node may also generate a new pattern, which is to replace one of the at least two patterns. The coordinating node may of course also replace all of the at least two patterns.

Alternatively or additionally, when the network node 140 is a radio base station, the further network node may be another radio base station. Thereby, the network node 140 provides information about patterns to the other radio base station, which may use this information as a transmission pattern. Typically, network node 140 has generated different patterns to be used by itself and the other radio base station.

When the further network node is the user equipment 130, the transmitting may be performed via broadcast, multicast or dedicated transmission. In some examples, only one pattern is transmitted via dedicated transmission in response to a request for configuration of patterns as explained in conjunction with FIG. 6b. In this manner, broadcast and multicast transmission is off-loaded, since the patterns is transmitted using dedicated transmission instead of broadcast or multicast. Typically, the patterns transmitted to the user equipment 130 are measurement patterns.

The information about the respective restricted area may also be transmitted to another network node or a user equipment 130 in this action.

Action 405

In some embodiments, the network node 140 further decides applicability of the at least two patterns based on the information about the respective restricted area. As a result, the network node 140 determines which of the at least two patterns shall be applied when the user equipment 130 is located in the respective restricted area. Typically, the at least two patterns are transmission patterns in these embodiments.

The network node 140 may further decide applicability of the at least two patterns based on available measurements relating to the user equipment, such as position, current precoding, bandwidth used, etc. Thus, facilitating determination of in which respective restricted area the user equipment is located in.

Action 404

In order to inform the user equipment 130 about which measurement patterns may be applied for different respective restricted areas, the network node 140 sends at least two measurement patterns to the user equipment 130. They may be sent via the radio base station. As mentioned, each measurement pattern is associated with a respective restricted area and each respective restricted area is smaller than an entire area of the cell.

The at least two measurement patterns may indicate when the user equipment 130 is to perform measurements in each respective restricted area. As an example, the measurements are performed towards the serving radio base station or a neighboring radio base station.

At least one of the at least two measurement patterns and the information about the respective restricted area may be received by the user equipment 130 via broadcast, multicast or dedicated signaling from the network node 140, such as a radio base station serving the user equipment 130.

Action 406

In order for the user equipment 130 to be aware of the respective restricted areas, the user equipment 130 obtains information about the respective restricted area. In this manner, measurements using different measurement patterns for different areas are configured. Expressed differently, the measurements are configured with different measurement patterns for different portions of the cell C0.

Similarly to above, now for the user equipment 130, the information about the respective restricted area may be obtained by at least one of reading pre-defined information about the respective restricted area, generating the information about the respective restricted area and receiving from the network node 140. The network node 140 may be a radio base station, serving or non-serving, or another node.

Similarly to above, now for the user equipment 130, the information about the respective restricted area may relate to at least one of:

Certain geographical area or direction;
Antenna configuration;
An area with certain radio environment characteristics;
An area defined by a certain user equipment behavior;
An area associated with certain signal strength/quality and user equipment requirements;
An area with certain performance characteristics; and
An area defined by user equipment capabilities or user equipment location.

Similarly to above, now for the user equipment 130, the information about the respective restricted area may be used for interference management, positioning, minimizing drive tests, or SON.

Action 407

In some embodiments, the user equipment 130 further decides applicability of the at least two measurement patterns based on the information about the respective restricted area.

In this manner, the user equipment 130 determines which of the at least two measurement patterns shall be used when the user equipment 130 is located in the respective restricted area. Typically, the at least two patterns are measurement patterns in these embodiments.

The deciding may further be based on at least one of user equipment capability (UE capability) and available measurements relating to the user equipment 130. Thus, facilitating determination of in which respective restricted area the user equipment is located in.

At conception of the embodiments herein, the following has been observed when studying a macro/pico cell deployment and signaling of measurement patterns and ABS patterns within such deployment. An ABS pattern is an example of a transmission pattern.

Firstly, observing measurement patterns. According to the current state of the art, a single measurement pattern per cell, such as serving cell, is to be decided. Even though the signal quality typically significantly varies over the cell area, using a single measurement pattern per cell may work in practice when all potentially strong interferers, e.g. macro cells, use the same ABS pattern. However, load typically varies significantly among cells and the ABS patterns shall be load-dependent to optimize network performance. With this, it is expected that different ABS patterns are configured in different cells, which may make it difficult or even impossible to decide the same measurement pattern over the entire cell subject to strong interference from different cells in different parts of the cell.

Configuring the most pessimistic measurement pattern for all user equipments, i.e. indicating the resources the user equipment can use for measurements when the user equipment is located in any part of the cell, may result in a small set of resources available for measurements. The small set of resources available for measurements increases user equipment complexity, reduces the measurement quality, and increases the measurement time.

This will lead to much more relaxed requirements for user equipments, being configured with the most pessimistic measurement pattern, compared to the legacy user equipments. That is to say, less stringent requirements for measurements by user equipments, being configured with the most pessimistic measurement pattern, needs to be allowed. This is, however, not desired, because less stringent requirements reduce performance, for example in terms of response time, for these user equipments. The consequence is bad overall performance in heterogeneous networks due to overly restricted and inflexible measurement occasion configuration, such as the mentioned small set of resources available for measurements.

In classical network deployments, e.g. without low-power nodes such as pico base stations or home radio base stations (home eNodeBs), the relaxed user equipment requirements for measurements also has the consequence of bad overall performance. A reason is that also in the classical network deployment, the relaxed, or rather less stringent, user equipment requirements for measurements implies reduced performance, for example in terms of response time, for these user equipments.

Secondly, when observing ABS patterns, it has been realized that another issue is that according to the state of the art only a single ABS pattern is signaled. However, with advanced antennas capable of dynamic antenna configuration techniques such as beam forming, transmit/receive diversity, distributed antenna systems, and multi-point transmitting/receiving techniques, etc., associating a single ABS pattern with a cell will put a strong limitation on the network performance. For example, although a cell is transmitting at some time instance, the power emission and thus the potential interference to other cells can be significantly suppressed in selected directions in this time instance and the directions may significantly vary with time. It is herein discussed how the transmit/receive directions can be associated with ABS patterns.

It is likely that a single measurement pattern will not be enough for intra-frequency and inter-frequency measurements. Also, a single measurement pattern will hardly be used for both the serving cell and neighbor cell measurements, at least without some rules on when and what measurements are to be performed with the measurement pattern provided to the user equipment.

Therefore, embodiments herein describe use of at least two patterns, such as transmission patterns or measurement patterns, for a cell. Each of the at least two patterns is associated with a respective restricted area which is smaller than an entire area of a cell as will be explained in more detail with reference to for example FIG. 3 and FIG. 5.

As discussed in the background section of the present disclosure, different interference coordination techniques, also referred to as enhanced ICIC (eICIC), have been discussed in the context of heterogeneous network deployments. To ensure robust performance for data and/or control channels, and to ensure consistent user equipment measurements such as mobility measurements, positioning measurements, and channel estimation in the presence of time-frequency radio resources with different interference conditions, the user equipment needs information that enables it to deduce the resources used for those measurements. This not only facilitates the user equipment measurements but it also keeps the user equipment performance at an acceptable level. In the current standard specification, as provided by the 3GPP, acquiring such information by the user equipment is not possible. It may have been proposed to signal a pattern to the user equipment, which pattern indicates subframes available for user equipment measurements.

Embodiments, related to the above mentioned heterogeneous deployment, will now be explained with reference to FIG. 5, which shows a radio communication system 100, which in this example is a heterogeneous radio communication system based on LTE. In other examples, the heterogeneous radio communication system may be based on Global System for Mobile communication (GSM), Universal Mobile Telecommunications System (UMTS), Code Division Multiple Access (CDMA) or the like.

The radio communication system 100 comprises a macro radio base station 110 and a pico radio base station 120. Typically, transmission power of the macro radio base station 110 is greater than transmission power of the pico radio base station 120. The network node 140, shown in FIG. 3, may be exemplified by the macro or pico radio base station 110, 120 as described in FIGS. 6a and 6b. Furthermore, the radio communication system 100 comprises cells, such as a first cell C1 and a second cell C2. In each cell C1, C2, there may be configured one or more patterns as described with reference to, for example, FIGS. 6a and 6b.

The macro radio base station 110 operates the first cell C1 having a first entire area A5. The first entire area A5 may be divided into a first area A3 and a second area A4. As mentioned above, this enables increased flexibility for configuration of patterns. The first area A3 and/or the second area A4 are smaller than the first entire area A5.

The pico radio base station 120 operates the second cell C2 having a second entire area A6. The second entire cell A6 may be divided into a third area A7 and a fourth area A8. Again, this enables increased flexibility for configuration of patterns. The third area A7 and/or the fourth area A8 are smaller than the second entire area A6.

Figure 5:
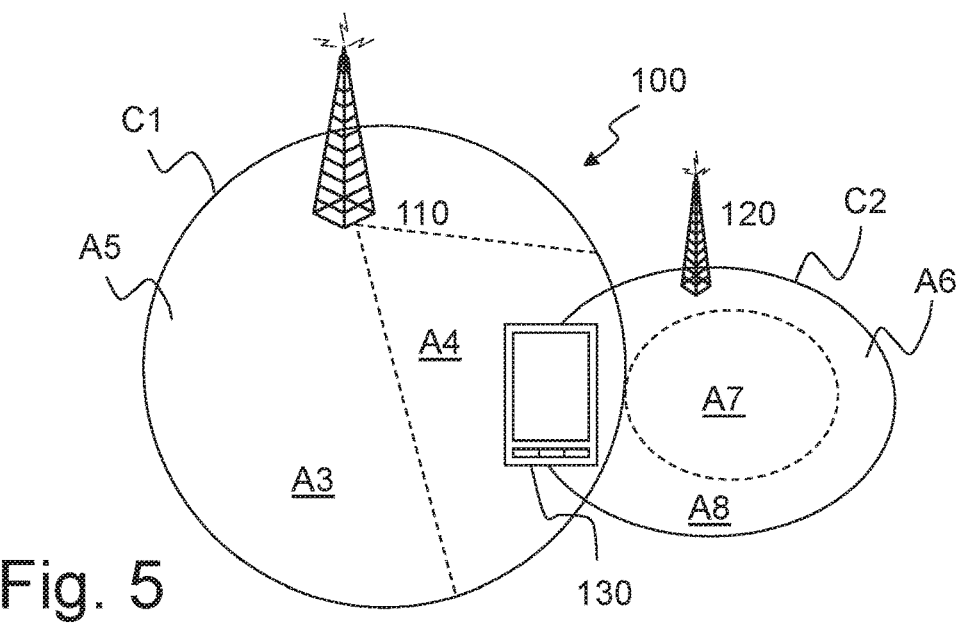
FIG. 5 shows a schematic overview of an exemplifying radio communication system in which exemplifying methods according to embodiments herein may be implemented.

The shapes of the areas A3-A8, shown in FIG. 5, are purely schematic and many other shapes are conceivable. Moreover, one or more of the areas A3-A8 may be overlapping.

In FIG. 5, a user equipment 130 is served by the pico radio base station 120. The user equipment is in this example located in the fourth area A8 of the pico radio base station 120. For example, the user equipment 130 may be a mobile phone, a cellular phone, a Personal Digital Assistant (PDA) equipped with radio communication capabilities, a smartphone, a tablet PC, a tablet device, a laptop equipped with an internal or external mobile broadband modem, a portable electronic radio communication device or the like.

Figure 6A:
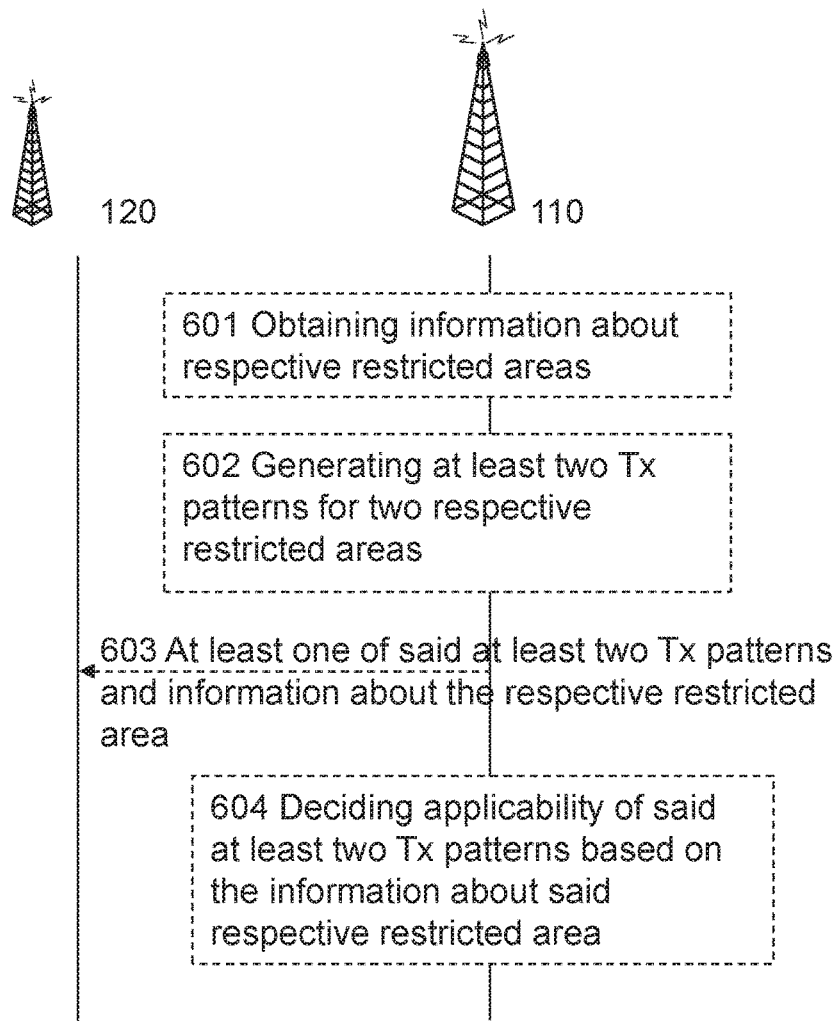
FIGS. 6a and 6b show schematic, combined signaling schemes and flowcharts of exemplifying methods performed in the radio communication system according to FIG. 5.

In FIG. 6a, a combined signaling scheme and flowchart of an exemplifying method performed in the radio communication system 100 according to FIG. 5 is shown. Here, the macro radio base station 110 is an example of the network node 140 in FIG. 3, and a first and a second ABS pattern are examples of the at least two patterns.

In this example, the following actions are performed.

Action 601

In order for the macro base station 110 to be aware of the first and second areas A3, A4, the macro radio base station 110 obtains information about the first and second areas A3, A4. Here, the first and second areas A3, A4 are examples of the respective restricted areas.

The obtaining may be performed by reading the information from a memory, i.e. the information is pre-defined. The memory is comprised in the macro base station 110. This and other examples will be elaborated below in list 2.

This action is performed in a similar manner as action 401.

Action 602

The macro radio base station 110 generates the first and second ABS patterns for the first and second areas A3, A4, respectively. The first and second ABS patterns will be used when the user equipment 130 is located in the first and second areas, respectively, as described in action 604.

With reference to the example of FIG. 5, the first ABS pattern, being associated with the first area A3, comprises fewer almost blank subframes than a number of almost blank subframes comprised in the second ABS pattern, being associated with the second area A4. The second ABS pattern is more restrictive, i.e. comprises a greater number of almost blank subframes, than the first ABS pattern in order to reduce interference towards the user equipment 120, located in the second area A4.

This action is performed in a similar manner as action 402.

Action 603

The macro radio base station 110 sends at least one of the first and second ABS patterns to the pico radio base station 120. Typically, the second ABS pattern is sent to the pico radio base station 120, since the pico radio base station 120 is located in the second area A4. In this manner, the pico radio base station 120 may determine its own ABS pattern while taking the second ABS pattern into account. Alternatively, the macro radio base station 110 generates and sends a further ABS pattern to be used by the pico radio base station 120. The further ABS pattern is generated while at least the second ABS pattern is taken into account.

Moreover, the macro radio base station 110 sends information about the second area, when the second ABS pattern is sent to the pico radio base station 120. In addition, the macro radio base station 110 may send information about the first area corresponding to the first ABS pattern. The pico radio base station 120 may use the information about the first and second areas to determine in which of the first and second areas it is located. In this manner, determination, by the pico radio base station 120, of its own ABS pattern is facilitated.

This action is similar to action 403 when the further node is a radio base station.

Action 604

The macro radio base station 110 decides applicability of the at least two patterns, such as the first and second ABS patterns, based on the information about the first and second areas A3, A4. As an example, the macro radio base station 110 is capable of beamforming. Then the macro base station 110 applies the first ABS pattern when a main transmission beam is in a first direction from the macro radio base station 110. The first direction may be in any direction within the first area A3. Furthermore, the macro base station 110 applies the second ABS pattern when the main transmission beam is in a second direction from the macro radio base station 110. The second direction may be in any direction within the second area A4. Further examples are given below in List 1. This action is performed in a similar manner as action 405.

Figure 6B:
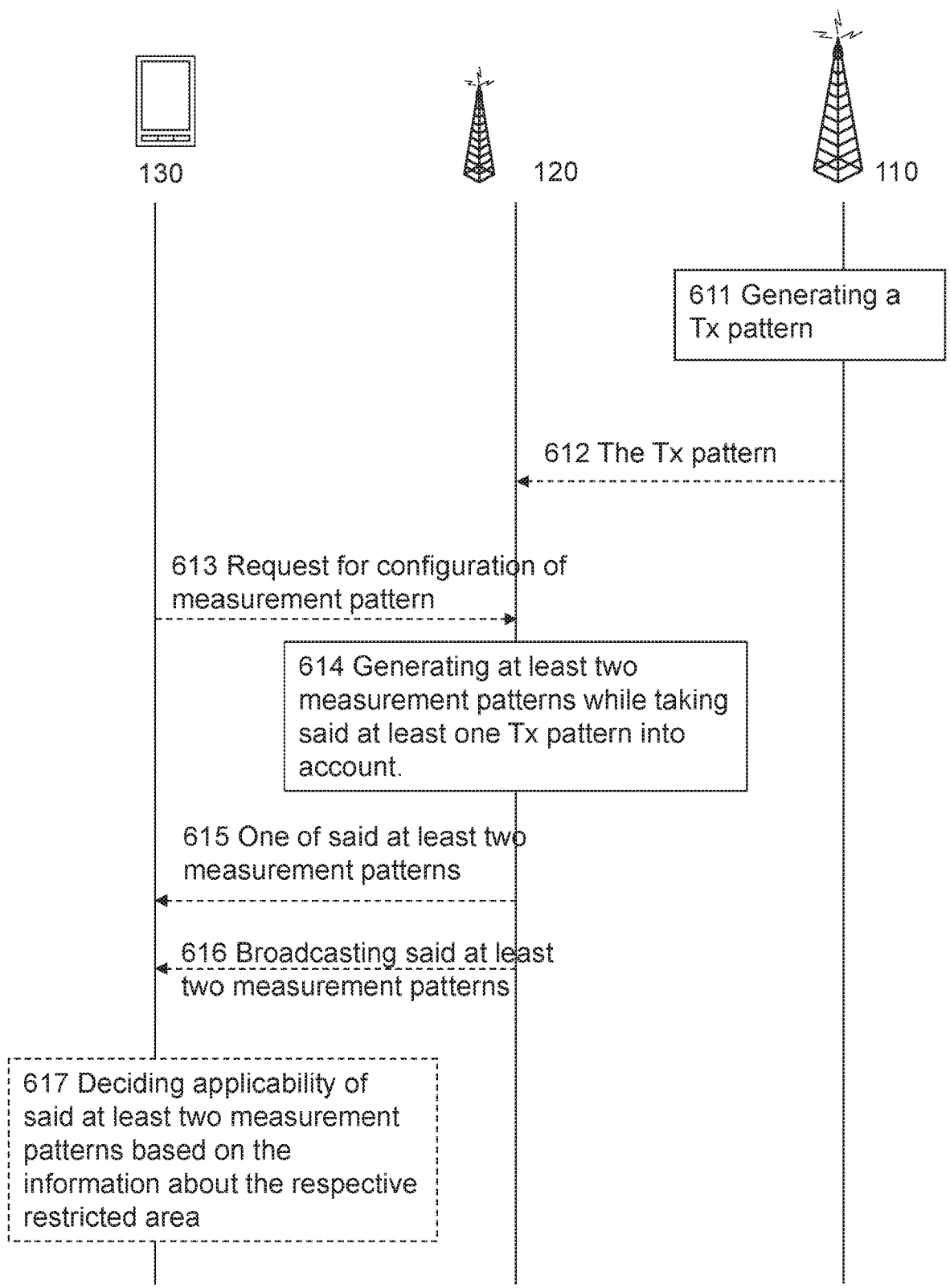

FIG. 6b illustrates a combined signaling scheme and flowchart of another exemplifying method performed in the radio communication system 100 according to FIG. 5. Here, the pico radio base station 120 is an example of the network node 140 shown in FIG. 3.

Action 611

The macro radio base station 110 generates a transmission (Tx) pattern, which pattern will be sent to the pico radio base station 120 in action 612 below. This action is performed in a similar manner as action 402.

Action 612

The macro radio base station 110 sends the transmission pattern to the pico radio base station 120. This action is performed in a similar manner as action 403.

Action 613

In some embodiments, the user equipment 130 sends a request for configuration of measurement pattern, e.g. to the pico radio base station 120. In this manner, the pico radio base station 120 may generate and send only the requested measurement pattern when the request also comprises information about in which area, such as the fourth area A8, the user equipment 130 is located in.

Action 614

The pico radio base station 120 generates at least a first and a second measurement (Mx) pattern while taking the transmission pattern into account. This transmission pattern may be configured for the first and second areas A3, A4, or for only the second area A4. Here, the first and second measurement patterns are examples of the at least two measurement patterns.

The transmission pattern is taken into account in that the first and second measurement patterns are associated with the third and fourth area A7, A8, respectively. See FIG. 5 for the third and fourth area A7, A8. In this example, the first measurement pattern is less restricted as compared to the second measurement pattern, since the third area A7 does not overlap with the second area A4. Consequently, the first measurement pattern of the third area A7 need not be adjusted to fit with almost blank subframes of the transmission pattern of the macro base station 110. That is to say, the first measurement pattern is not designed to avoid interference from the macro radio base station 110, because as given by the first, second, third and fourth areas A3, A4, A7, A8 it is not expected that transmission from the macro radio base station 110 will severely affect measurements performed by the user equipment 130, when it is located in the third area A7.

Generally, it may be desired to generate the first and second measurement patterns such that transmission from the macro radio base station 110, indicated by the transmission pattern, is avoided. Thereby, interference from the macro radio base station 110 towards the user equipment 130, when performing measurements, is reduced.

This action is performed in a similar manner as action 402.

Action 615

In some embodiments, the pico radio base station 120 sends one of the first and second measurement patterns to the user equipment 130. Typically, this action is performed in response to the reception of the request for configuration of measurement patterns as exemplified in action 613. Thanks to the reception of the request, multicast or broadcast transmission may be avoided as mentioned above. This action is performed in a similar manner as action 404.

Action 616

In some embodiments, the pico radio base station 120 broadcasts, or sends in the form of broadcast or multicast transmission, the first and second measurement patterns. Typically, broadcasting of measurement patterns is performed when no request for configuration of measurement patterns is received by the pico radio base station 120.

When a request is received by the pico radio base station 120, the first and/or second measurement pattern may be sent using dedicated transmission. Hence, multicast and broadcast transmissions are offloaded.

This action is performed in a similar manner as action 404.

Action 617

The user equipment 130 decides applicability of the first and second measurement pattern based on information about the third and fourth area A7, A8.

The information about the third and fourth area A7, A8 may be pre-defined, but other examples are also given below. When the user equipment 130 decides which of the first and second measurement patterns shall be applied, it may determine in which of the third and fourth areas A7, A8 it is located. This may be performed determined by use of available measurements for positioning purposes. This action is performed in a similar manner as action 407.

It shall be noted that a coordinating node for coordination of the at least two patterns may in some examples generate the at least two patterns. Next, the patterns and information about their respective restricted areas are sent to, for example, the macro and/or pico radio base station.

Now returning to the examples of FIGS. 3 and 4, the methods will be described again, but when seen from the network node 140 and the user equipment 130, respectively. Furthermore, configuration of the network node and the user equipment, being configured to for perform the methods in FIG. 4, will be described in FIG. 8 and FIG. 10.

Figure 7:
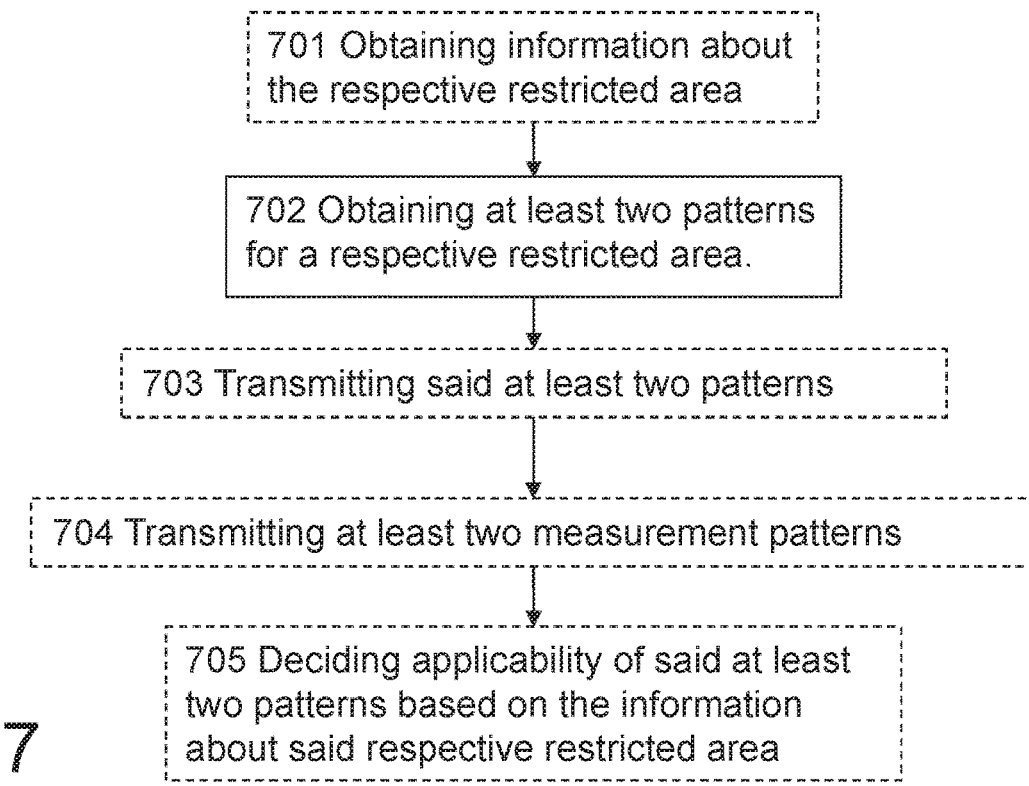
FIG. 7 shows a schematic flowchart of the methods of FIG. 4 when seen from the network node.

FIG. 7 shows a flowchart of the method in the network node 140, as shown in FIG. 4, for enabling configuration of at least two patterns for the cell C1. As mentioned above, the patterns are transmission patterns or measurement patterns. The network node 140 may be a radio base station and the cell C1 is operated by the radio base station. The network node 140 may be a coordinating node.

The method comprises the following actions, which may be performed in any suitable order.

Action 701

In some embodiments, the network node 140 obtains the information about the respective restricted area, such as the first and second areas A1, A2. As mentioned above, the information about the respective restricted area may be obtained by at least one of reading pre-defined information about the respective restricted area, generating the information about the respective restricted area and receiving from a further node. The further node may be a pico/macro radio base station, a coordinating node or O&M system. These and other examples will be elaborated below in List 2.

As mentioned above, the information about the respective restricted area may relate to at least one of:
Certain geographical area or direction;
Antenna configuration;
An area with certain radio environment characteristics;
An area defined by a certain user equipment behavior;
An area associated with certain signal strength/quality and user equipment requirements;
An area with certain performance characteristics; and
An area defined by user equipment capabilities or user equipment location. These and other examples will be elaborated below in List 1.

This action is performed in a similar manner as action 401.

Action 702

The network node 140 obtains the at least two patterns. As mentioned above, each of the at least two patterns is associated with information about the respective restricted area A1, A2 such that each pattern is used when the user equipment 130 served by the cell C1 is located in the respective restricted area. Each respective restricted area A1, A2 is smaller than an entire area of the cell C1.

The at least two patterns may comprise a first pattern and a second pattern, the first and the second patterns are associated with at least one of the following characteristics: bandwidth, transmit power levels, power reduction, and subframe properties. A first value of the at least one characteristic associated with the first pattern is different from a second value of the same characteristic associated with the second pattern. The subframe properties may relate to MBSFN/non-MBSFN subframes.

The obtaining may be performed by generating the at least two patterns or receiving the at least two patterns from another network node. The at least two patterns may comprise at least two transmission patterns related to transmission power or transmission activity in the cell C1. As an example, the transmission power may be decreased or increased. Alternatively or additionally, the at least two patterns may comprise at least two measurement patterns.

As mentioned above, the at least two measurement patterns may be different from each other. The first measurement pattern of the at least two measurement patters is intended for measurements with measurement gaps and the second measurement pattern of the at least two measurement patterns is intended for measurements without measurement gaps.

This action is performed in a similar manner as action 402.

Action 703

In some embodiments, the network node 140 transmits the at least two patterns to a further network node or a user equipment 130. The further network node may be the pico/macro radio base station or a core network node, such as the coordinating node. The transmitting may be performed as broadcast, multicast or dedicated transmission. The network node 140 may further transmit the information about the respective restricted area. This action is performed in a similar manner as action 403.

Action 704

The network node 140 may further transmit the at least two measurement patterns. This action is performed in a similar manner as action 404.

Action 705

In some embodiments, the network node 140 decides applicability of the at least two patterns based on the information about the respective restricted area. This action is performed in a similar manner as action 405.

Figure 8:
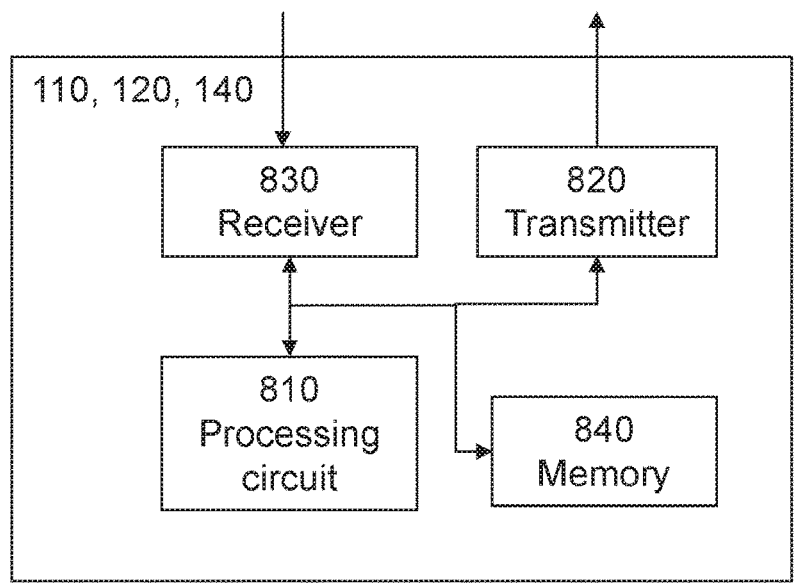
FIG. 8 shows a schematic block diagram of an exemplifying network node configured to perform the methods illustrated in FIG. 7.

FIG. 8 shows a schematic block diagram of the exemplifying network node 140, which is configured to perform the method illustrated in FIG. 7. The network node 140 is configured to enable configuration of at least two patterns for the cell C1. As mentioned above, the patterns are transmission patterns or measurement patterns. The network node 140 may be a radio base station, such as the macro or pico radio base station 110, 120 and the cell C1 is operated by the radio base station. The network node 140 may in other examples be a coordinating node, such as an O&M.

The network node 140 comprises a processing circuit 810 configured to obtain the at least two patterns. Each of the at least two patterns is associated with a respective restricted area A1, A2 such that each pattern is used when the user equipment 130 served by the cell C1 is located in the respective restricted area. Each respective restricted area A1, A2 is smaller than an entire area of the cell C1.

The processing circuit 810 may further be configured to generate the at least two patterns or receive the at least two patterns from another network node.

The at least two patterns may comprise a first pattern and a second pattern, the first and the second patterns are associated with at least one of the following characteristics: bandwidth, transmit power levels, power reduction, and subframe properties. A first value of the at least one characteristic associated with the first pattern is different from a second value of the same characteristic associated with the second pattern.

The at least two patterns may comprise at least two transmission patterns related to transmission power or transmission activity in the cell C1. Alternatively or additionally, the at least two patterns may comprise at least two measurement patterns.

As mentioned above, the at least two measurement patterns may be different. A first measurement pattern of the at least two measurement patters may be intended for measurements with measurement gaps and a second measurement pattern of the at least two measurement patterns may be intended for measurements without measurement gaps.

The processing circuit 810 may further be configured to obtain the information about the respective restricted area by at least one of reading pre-defined information about the respective restricted area, generating the information about the respective restricted area and receiving from another node.

The information about the respective restricted area may relate to at least one of:
Certain geographical area or direction;
Antenna configuration;
An area with certain radio environment characteristics;
An area defined by a certain user equipment behavior;
An area associated with certain signal strength/quality and user equipment requirements;
An area with certain performance characteristics; and
An area defined by user equipment capabilities or user equipment location.

In some embodiments, the processing circuit 810 further is configured to decide applicability of the at least two patterns based on the information about the respective restricted area.

The information about the respective restricted area may be used for interference management, positioning, minimizing drive tests, or SON.

The processing circuit 810 may be a processing unit, a processor, an application specific integrated circuit (ASIC), a field-programmable gate array (FPGA) or the like. As an example, a processor, an ASIC, an FPGA or the like may comprise one or more processor kernels.

The network node 140 further comprises a transmitter 820, which in some embodiments is configured to transmit the at least two patterns to another network node or the user equipment 130.

The transmitter 820 further may be configured to transmit via broadcast transmission, multicast transmission or dedicated transmission. When the transmitter 820 is configured to transmit via dedicated transmission, the transmission is dedicated to the user equipment 130.

The transmitter 820 further may be configured to transmit information about the respective restricted area.

The network node 140 further comprises a receiver 830, which in some embodiments is configured to receive measurement reports from the user equipment 130. The receiver 830 may be configured to receive a request for measurement configuration from the user equipment 130.

The network node 140 further comprises a memory 840 for storing software to be executed by, for example, the processing circuit. The software may comprise instructions to enable the processing circuit to perform the method in the network node 140 as described above in conjunction with FIG. 7. The memory 840 may be a hard disk, a magnetic storage medium, a portable computer diskette or disc, flash memory, random access memory (RAM) or the like. Furthermore, the memory may be an internal register memory of a processor.

Figure 9:
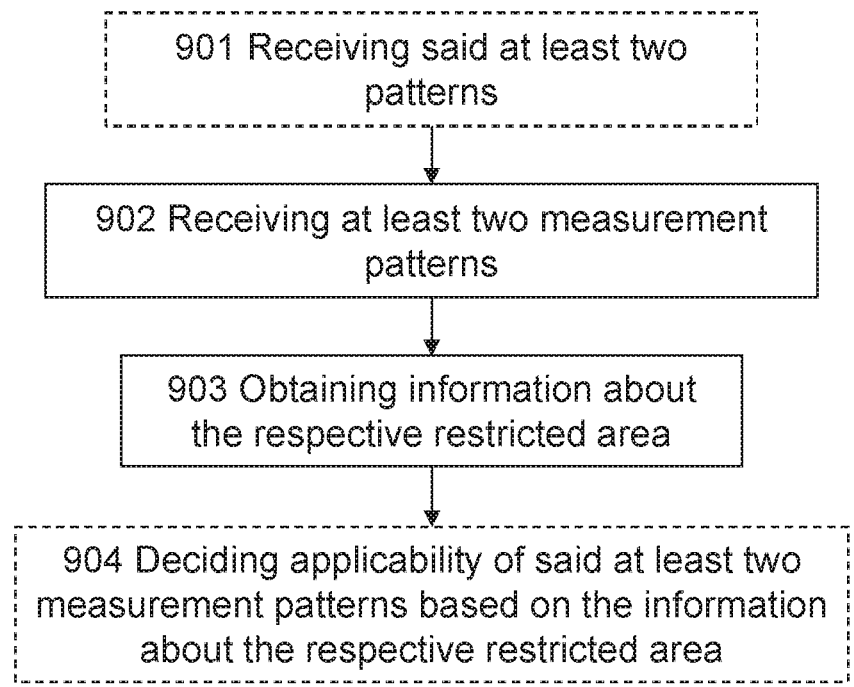
FIG. 9 shows a schematic flowchart of the methods of FIG. 4 when seen from the user equipment.

FIG. 9 shows a schematic flowchart of the method in the user equipment 130, as shown in FIG. 4, for configuring measurements. The user equipment 130 is served by a cell C1 of a radio base station. The method comprises the following actions, which may be performed in any suitable order.

Action 901

The user equipment 130 may receive the at least two patterns. This action is performed in a similar manner as action 403.

Action 902

The user equipment 130 receives at least two measurement patterns from the radio base station. Each measurement pattern is associated with a respective restricted area such that each measurement pattern is used when the user equipment 130 is located in the respective restricted area. As mentioned above, each respective restricted area is smaller than an entire area of the cell.

As mentioned above, at least one of the at least two measurement patterns and the information about the respective restricted area may be received as broadcast, multicast or dedicated transmission.

The at least two measurement patterns may comprise a first pattern and a second pattern. The first and the second patterns may be associated with at least one of the following characteristics: bandwidth, transmit power levels, power reduction, or subframe properties A first value of the at least one characteristic associated with the first pattern is different from a second value of the same characteristic associated with the second pattern.

This action is performed in a similar manner as action 404.

Action 903

The user equipment 130 obtains information about the respective restricted area, thereby configuring measurements.

As mentioned above, the user equipment 130 may obtain the information about the respective restricted area by at least one of reading pre-defined information about the respective restricted area, generating the information about the respective restricted area and receiving from another node.

The information about the respective restricted area may relate to at least one of:

Certain geographical area or direction;
Antenna configuration;
An area with certain radio environment characteristics;
An area defined by a certain user equipment behavior;
An area associated with certain signal strength/quality and user equipment requirements;
An area with certain performance characteristics; and
An area defined by user equipment capabilities or user equipment location.

The at least two measurement patterns may be indicating when the user equipment 130 is to perform measurements in each respective restricted area.

This action is performed in a similar manner as action 406.

Action 904

In some embodiments, the user equipment 130 decides applicability of the at least two measurement patterns based on the information about the respective restricted area.

The deciding may further be based on at least one of: user equipment capability and available measurements relating to the user equipment 130.

This action is performed in a similar manner as action 407.

Figure 10:
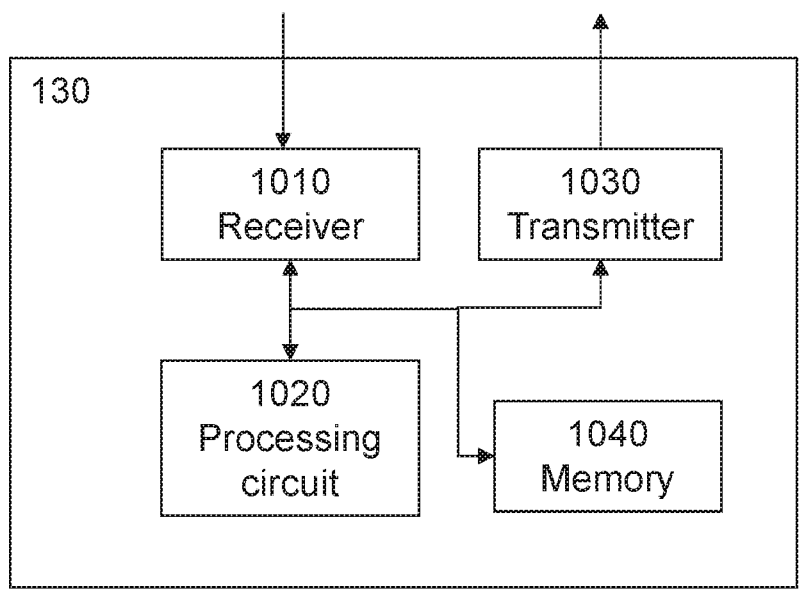
FIG. 10 shows a schematic block diagram of an exemplifying user equipment configured to perform the methods illustrated in FIG. 9.

FIG. 10 shows a schematic block diagram of an exemplifying user equipment 130 configured to perform the method illustrated in FIG. 9. The user equipment 130 is configured to configure measurements. Expressed differently, the user equipment is configured to set up measurement patterns to be used when the user equipment is located in different restricted areas of a cell. The user equipment 130 is also configured to be served by the cell C1 of the radio base station.

The user equipment 130 comprises a receiver 1010 configured to receive at least two measurement patterns from the radio base station. As mentioned above, each measurement pattern is associated with a respective restricted area such that each measurement pattern is used when the user equipment (130) is located in the respective restricted area. As mentioned above, each respective restricted area is smaller than an entire area of the cell.

The measurement patterns may be indicating when the user equipment 130 is to perform measurements in each respective restricted area.

As mentioned above, the at least two measurement patterns may comprise a first pattern and a second pattern. The first and the second patterns may be associated with at least one of the following characteristics: bandwidth, transmit power levels, power reduction, or subframe properties. A first value of the at least one characteristic associated with the first pattern is different from a second value of the same characteristic associated with the second pattern.

In some embodiments, the receiver 1010 further is configured to receive via broadcast, multicast or dedicated transmission at least one of: the at least two measurement patterns and the information about the respective restricted area.

The information about the respective restricted area may relate to at least one of:

Certain geographical area or direction;
Antenna configuration;
An area with certain radio environment characteristics;
An area defined by a certain user equipment behavior;
An area associated with certain signal strength/quality and user equipment requirements;
An area with certain performance characteristics; and
An area defined by user equipment capabilities or user equipment location.

Furthermore, the user equipment 130 comprises a processing circuit 1020 configured to obtain information about the respective restricted area, whereby the user equipment 130 is configured for configuring measurements. The processing circuit 1020 may further be configured to obtain the information about the respective restricted area by at least one of reading pre-defined information about the respective restricted area, generating the information about the respective restricted area and receiving from the radio base station or another node.

The processing circuit 1020 may further be configured to decide applicability of the at least two measurement patterns based on the information about the respective restricted area.

The processing circuit 1020 may further be configured to decide the applicability of the at least two patterns based on at least one of: user equipment capability and available measurements relating to the user equipment 130.

The processing circuit 1020 may be a processing unit, a processor, an application specific integrated circuit (ASIC), a field-programmable gate array (FPGA) or the like. As an example, a processor, an ASIC, an FPGA or the like may comprise one or more processor kernels.

The user equipment 130 further comprises a transmitter 1030, which in some embodiments is configured to transmit reports pertaining to the measurements performed according to the configured measurement pattern or measurement patterns. The transmitter 1030 may be configured to send a request for configuring measurements.

The user equipment 130 further comprises a memory 1040 for storing software to be executed by, for example, the processing circuit. The software may comprise instructions to enable the processing circuit to perform the method in the user equipment 130 as described above in conjunction with FIG. 9. The memory 1040 may be a hard disk, a magnetic storage medium, a portable computer diskette or disc, flash memory, random access memory (RAM) or the like. Furthermore, the memory may be an internal register memory of a processor.

Generally, the present disclosure relates to methods and arrangements in wireless telecommunication systems, and particularly the present disclosure relates to methods and arrangements that use patterns defining the transmission activity of at least some transmission devices where receiving nodes may also use certain patterns for their measurements.

Embodiments herein relate to methods and arrangements that enable transmission activity and measurement patterns to be applicable to restricted areas that are smaller than the entire planned cell coverage area. In the following, these patterns are referred to as ABS patterns with restricted applicability and measurement patterns with restricted applicability.

Certain embodiments herein define the scope of the restricted applicability for ABS and transmission patterns, and associate the area with the patterns. The embodiments also include node functionality associated with defining or communicating the restricted areas. Further, the embodiments include one or more signaling circuits configured to provide patterns with restricted applicability. Finally, the embodiments include pre-defined rules that associate a pattern with a restricted area and/or a cell.

Finally, one or more embodiments permit the restricted area information to be used for other purposes, including SON, positioning, minimizing drive tests, etc.

The following terms and generalizations are used throughout the present disclosure:

Network Type:

Examples of network types are heterogeneous, macro/pico, traditional and classical network deployments. The methods and arrangements disclosed herein have been primarily designed for heterogeneous deployments, but are not limited to them. The methods and arrangements are also not limited to any 3GPP definition of heterogeneous network deployments. For example, the methods and arrangements could be well adopted for traditional macro deployments, also referred to as classical deployments herein, and/or networks operating more than one radio access technology (RAT). Although the methods and arrangements are primarily designed for cellular networks with a transmitting node that transmits in the downlink (DL), the methods and arrangements generally apply to any network where different nodes use different transmit power and are capable of configuring their transmission patterns. Such a network can also be an ad hoc network or a network deploying device-to-device communication or a wireless network with node coverage defined based on the received signal power.

A Transmitting Node:

A transmitting node is typically referred to herein as an eNodeB herein. However, a transmitting node may generally comprise any radio network node capable of transmitting radio signals, e.g. macro eNodeB, pico, eNodeB, micro eNodeB, home eNodeB, relay nodes, etc.

A Receiving Node:

A receiving node is typically referred to herein as a user equipment. However, a receiving node may generally comprise any radio device capable of receiving radio signals, e.g. user equipments, PDAs, laptops, relays, etc.

A Transmission Activity Pattern:

A transmission activity pattern is typically referred to herein as an Almost Blank Subframe (ABS) pattern. In general, however, a transmission activity pattern is a configuration of a transmission activity scheduled for a node over a certain period of time. An ABS refers to one or more time instances with the ABS pattern where the transmission activity is lower than in non-ABS subframes. Here, "lower" means either a transmission at a reduced power level or no transmission at all for certain channels/signals or all transmissions. Although focusing on reduced transmission activity, herein may also be used for indicating increased transmission activity, e.g. for the purpose of indicating potentially high interference from the corresponding node. An ABS pattern may or may not include other patterns, e.g. MBSFN subframes configured as ABS, and may or may not be a part of an ABS pattern, as decided by the network or according to a pre-defined behavior of network nodes. An ABS pattern may be defined per frequency carrier, and hence multiple patterns can then be designed for multiple carriers, or the same ABS pattern may also be used for more than one cell or carrier associated with the same eNodeB. ABS may also be configured over a certain part of the system bandwidth. E.g. six resource blocks centered at the DC carrier or any bandwidth centered at the carrier bandwidth center in a multi-carrier system. In another embodiment the power reduction, e.g. compared to non-ABS subframes in the same pattern or compared to the maximum absolute power level of the cell, applied in ABS, e.g. the total transmit power reduction for all signals/channels or for specific reference signals or control channels or control region or data region, is signaled together with ABS. The ABS patterns and such additional information, e.g. the bandwidth, frequency, power reduction in ABS, may be signaled, e.g., from the transmitting node to a receiving node, e.g. over RRC, where the user equipment may be allowed to decide whether to account for the ABS, e.g. as described for multicast/broadcast, and the associated information, or from the transmitting node to more than one receiving node by means of multicast or broadcast signaling, where the group of receiving node is decided e.g.

By the network, which is e.g. using a multicast channel received by the target group, By the user equipment e.g.

ABS and the associated information apply for user equipments in the expanded part of the cell, i.e. for user equipments using biased cell association. Such user equipment behavior may be pre-defined, when the difference between the received signal power level or the received signal quality level of the interfering cell and that of the serving cell exceeds a certain threshold.

between two transmitting nodes, e.g. over X2 or via O&M system.

A measurement pattern is a pattern indicating for a user equipment when measurements are to be taken. A measurement type may be associated with a measurement pattern, e.g. 'RRM', 'RLF', 'CSI', etc, which may be signaled together with the pattern or may be pre-defined. RLF stands for Radio Link Failure. The measurements are typically performed on the serving cell, so the measurement is expected to be associated with the serving cell. The measurement pattern for the serving cell may or may not be applicable for measuring neighbor cells, and thus a set of measurement patterns may be provided in association with a set of cells. The signaling means of a measurement pattern and the user equipment behavior may be the same as for an ABS pattern. However, the user equipment shall be able to understand that if an ABS pattern for some cell 1 indicates time instances when the cell does not transmit, then these instances shall be excluded from measurement occasions for this cell; on the other hand, they shall be considered as potential measurement occasions for measurements on another cell, cell 2, for which cell 1 is a strong interferer. In the same way, a measurement pattern shall be explicitly associated with a cell, e.g. it may be good for measuring the serving cell, but may be not very good for measuring neighbor cells. The association can e.g. be explicit signaling of the cell ID together with the pattern or pre-defined (e.g. always for the serving cell or for cells on the same nodes layer as the serving cell, where a layer may be related to a power class such as pico, micro, macro BS, and/or for cells on the same frequency). A measurement pattern may also be signaled with associated information such as bandwidth and frequency. For the same user equipment, different rules may also exist for defining and applying patterns for measuring with and without gaps (e.g. intra-frequency vs inter-frequency, on the other component carrier(s) which are activated vs deactivated, intra-RAT vs inter-RAT). Alternatively, different patterns may be explicitly signaled to the user equipment for measurements with and without measurement gaps. The disclosed aspects of pattern association with cells and patterns for measurement with/without gaps are also contemplated herein, and they may or may not combine with the restricted area embodiments, i.e. restricted applicability is now related to measurement types and cells.

As contemplated herein, patterns are designed with restricted applicability and their relation to patterns: An ABS pattern or a measurement pattern is associated with some specific area.

A restricted area is an area smaller than the entire planned cell coverage area or the area associated with a subset of user equipments (e.g. related to the user equipment capability). The restricted areas may also geographically overlap.

The entire planned coverage area is typically defined, but not limited to this definition, assuming cell association based on received signal strength. That is, the cell planned coverage area is the area where the received signal strength of the cell is the maximum among all detectable neighbor cells, assuming the default transmit power configuration (typically maximum), the default transmit antenna configuration, and a typical receiver configuration, e.g. a user equipment with an omni-directional antenna. Some biased cell selection with a given bias for a given set of cells, e.g. a bias of 10 dB for pico cells, to expand the coverage of pico cells, can also be assumed when defining the planned coverage area of a cell. In general, any default network configuration may be assumed when referring to the planned coverage area of a cell.

Different patterns or different types of patterns may also be associated with different restricted areas. For example, pattern 1 with better interference conditions for user equipment measurements may be associated with one restricted area, and pattern 2 with worse interference conditions in average may be associated with another restricted area, e.g. where CRS is not applied. These different patterns or pattern types can also be used by legacy (certain release) user equipments or user equipments with a minimum capability. Pattern 1 can be a pattern composed of MBSFN subframes and pattern 2 can be composed of non-MBSFN ABS subframes or a mix of blank subframes with different properties.

Different embodiments related to the definition of the restricted area and the nodes involved are further described in this section.

Restricted Area:

The restricted area may relate, e.g., to any one or more aspect or their combination of the below:

List 1:

certain geographical area, e.g. based on the
location information of the user equipment,
timing positioning measurements (timing advance, RSTD, ToA, etc.) which are generally related to the distance,
direction of the user equipment location (UE location). For example, Angle of arrival measurement (AoA measurement) or any direction of arrival information,
proximity information, e.g. close to a certain type of radio nodes such as home eNodeBs, pico cells, Closed Subscriber Group cells (CSG cells), etc.
antenna configuration, e.g.
main (transmitting) beam direction of the antenna system in a cell of an eNodeB, or
main (receiving) beam direction of the antenna system of the user equipment,
precoding information for the transmitting antenna system of eNodeB,
precoding information obtained by the receiving node,
Here, the direction may be configured/known (e.g. at the eNodeB: tilt/azimuth antenna configuration, codebook index, precoding matrix, etc.) or it may be estimated. E.g. the direction of the strongest interferer estimated by the user equipment; precoding matrix or precoding matrix indicator estimated by the user equipment and also feed back to the network. The direction may also be absolute, e.g. latitude, longitude, or relative, e.g. with respect to the main beam, or may be represented by a precoding matrix or an index pointing to a pre-defined precoding configuration.
an area with certain radio environment characteristics, e.g.
indoor environment which may be explicitly indicated e.g. by the user equipment or found out by the network e.g. based on the available statistics and/or obtained UE measurements,
environment identified as "difficult" e.g. based on
the user equipment measurements from the serving cell, such as measurement failure report statistics, high error rate, high delay spread, low Signal-to-Interference-Plus-Noise-Ratio (SINR), etc.,
combination of the user equipment measurements from multiple cells (example: RSRP from cell 1, RSRP from cell 2 and RSRP from cell 3),
measurements collected from multiple user equipments where the measurements may also be associated with RF fingerprinting and Adaptive Enhanced Cell ID (AECID) maps,
number of strong interferers (e.g. signal strength above a certain threshold),
relation between the received signal power levels among neighbor cells (e.g. the difference between the interferer and the server is above a certain threshold).
an area defined by a certain user equipment behavior, e.g.
biased cell selection, where a user equipment may be associated with a cell weaker than an interfering neighbor cell and it may be so that not all user equipments may apply the biased cell selection or not up to the maximum allowed range e.g. defined by the maximum absolute offset of 24 dB; the decision may be based on the user equipment capability defined by the user equipment release, interference suppression capability, user equipment category, etc.
an area associated with certain signal strength/quality and user equipment requirements which may be associated with certain pattern properties such as pattern blanking rate and pattern blanking density;
an area with certain performance characteristics, e.g.
an area where many radio link failure occur,
an area with many dropped calls,
handover areas,
areas where relatively strong (e.g. compared to some threshold(s)) signals are received from cells associated with a certain base station power class (e.g. pico and macro),
areas where relatively strong (e.g. compared to some threshold(s)) signals are received from at least some given number of cells which where the number of cells may be further detailed by BS power class (e.g. >=2 detectable and relatively strong/close macro cells in the area where a user equipment is served by a pico cell).

an area defined by UE capabilities, e.g. where restricted areas may overlap and each restricted area is associated with a subset of user equipments.

In one embodiment, the restricted area information as described above is used for interference management in heterogeneous network environments.

In another embodiment, this information is used for positioning and other purposes such as minimizing drive tests, network and user equipment testing purpose, SON, etc. Using of the information may comprise using it for grouping user equipments according to the corresponding restricted area criteria, which for positioning may be exploited e.g. for building up the assistance data, configuring muting of signals used for positioning measurements or in the positioning method selection logic. Using for minimizing drive tests may comprise selecting the user equipments that report measurements for this purpose or as a triggering condition for reporting measurements for this purpose when e.g. being located or entering the corresponding restricted area.

The restricted area may be obtained, by the user equipment or the network node as given by the context, in one or more of the following manners:

List 2:
Pre-defined, e.g. according to core or performance requirements or specified behavior Example 1: a measurement pattern is associated with the expanded cell area (e.g. for which the cell selection bias, or offset, larger than a predefined threshold e.g. 10 dB); furthermore, a certain number of blank subframes in the pattern may also be associated with a certain value of the threshold e.g. according to the requirements applicability condition.

Example 2: the minimum SINR at which the user equipment may not need to use the pattern and falling below which triggers the usage of the pattern.

Decided solely by the user equipment based e.g. on the user equipment capability and/or the available measurements, i.e. a user equipment decides whether the area is critical and either requests pattern configuration or the network sends the patterns to all user equipments, but the user equipments decide whether, when and how to apply the patterns. The decision criteria may be the level of the currently experienced signal quality, the detected set of neighbors, etc. and may be implementation-dependent.

Configured by eNodeB (where in general either the configured condition is signaled to the user equipment, in order to assist the user equipment, or used solely by the eNodeB to decide to which user equipments a pattern needs to be signaled e.g. via RRC protocol)

Example 1: the minimum SINR defined by eNodeB at which the user equipment may not need to use the pattern and falling below which triggers the usage of the pattern; the pattern may be signaled to user equipments which report bad SINRs or the SINR level may be signaled to the user equipment together with the pattern to facilitate the user equipment decision.

Example 2: A pattern is relevant for user equipment in the proximity of a home eNodeB operating a CSG cell not selectable by the user equipment. Thus experiencing strong interference from the home eNodeB, but not able to reselect it being not a part of the CSG. A list of such CSG cells may be defined by the eNodeB to the user equipment together with a condition defining the proximity (e.g. a threshold for the received signal or the SINR).

Example 3: location within a certain area where pattern shall be used and the area is defined by eNodeB; the location may be signaled together with the pattern or the eNodeB may signal to the user equipments that are estimated to be within the defined area.

Example 4: user equipments within a certain sector angle defined by eNodeB centered at the main beam direction of a pico cell do not need to use pattern, which may be the user equipment decision on whether to use/not use patterns or the eNodeB decision on whether transmit/not transmit pattern.

Example 5: user equipments not measuring in the direction(s) defined by eNodeB, may not use patterns (the "prohibited" directions may be decided by the eNodeB e.g. based on collecting PMI measurements from multiple user equipments and the associated signal quality measurement statistics).

"prohibited" directions may be signaled to the user equipment together with a pattern, where the "prohibited" directions may be represented by one or more precoding matrices or indexes pointing to pre-defined matrices;

Alternatively, the pattern(s) may be sent to user equipments for which the reported PMI indicates that the UE is close to the "prohibited" direction(s) and not sent to other user equipments.

Configured by a master eNodeB, e.g. a macro eNodeB, and signaled to a set of associated cells, e.g. pico cells in the coverage area of the macro cell in question, e.g. over the X2 interface.

Configured by a coordinating network node which communicates dynamically with a set of eNodeBs.

Configured semi-statically by O&M and signaled over an eNodeB/O&M interface to the eNodeB.

It shall also be understood that a node, such as the network node, involved in deciding the patterns will typically have the ability of doing one or more of the following:

acquire the information about the restricted area, where acquiring means e.g. receiving the information from other nodes or generating locally based on other available information or based on other information received from other nodes, generate a pattern associated with at least one restricted area, generate a combined pattern for two or more restricted areas, communicate to other nodes, such as user equipment or network nodes, a pattern associated with the restricted area information, receive a pattern associated with at least one restricted area, decide the applicability of a pattern given by the available restricted area information, e.g. available locally from measurements or other sources or received from other nodes and/or received together with the pattern, associate the measurement pattern with a cell based on the restricted area information, update the pattern at an event associated with changing the restricted area (e.g. changing antenna configuration or user equipment moving to another location).

Signaling for communicating patterns with restricted applicability may involve:

X2AP (a protocol over the X2 interface);

RRC (a protocol over the Uu interface), which may be dedicated or cell-specific or area-specific signaling with the associated restricted area information (pre-defined or signaled, as described above);

Signaling over the interface between eNodeB and O&M or the coordinating network node;

S1AP (a protocol over the X2 interface): in case it is considered beneficial to communicate this information between eNBs which do not have a X2 interface available, it could also be signaled as part of the SON information transfer already available on S1 interface or may be a new signaling over this interface.

In the X2 signaling example, several patterns with restricted applicability could be signaled for each cell served by the macro and/or pico eNB using the LOAD Indication procedure. In particular, the macro eNB could send the LOAD INFORMATION message to the pico eNB, where such message may contain a new information element, for example called ABS Patterns with Restricted Applicability IE. This new IE could contain the patterns and the restriction information for each of them. The restriction information may be a description of the restricted areas defined above.

Alternative codings may be possible which would not change the validity of this disclosed method Even though embodiments of the various aspects have been described, many different alterations, modifications and the like thereof will become apparent for those skilled in the art. The described embodiments are therefore not intended to limit the scope of the present disclosure.

The invention claimed is:

1. A method performed by a user equipment configured for use in a wireless communication system, the method comprising:
    receiving, for each of a plurality of different restricted areas of a cell, a respective one of multiple different transmission patterns that is to be used in the different restricted area, wherein:
        the multiple different transmission patterns comprise different patterns of resources in time which are usable for performing radio measurements;
        each of the different restricted areas of the cell is smaller than an entire area of the cell; and
        the multiple different transmission patterns comprise no transmission of a specific reference signal; and
    receiving using a transmission pattern of the multiple different transmission patterns.

2. The method of claim 1, further comprising determining which one of the multiple different transmission patterns the user equipment is to be configured with based on in which of the plurality of different restricted areas of the cell the user equipment is located.

3. The method of claim 1, further comprising transmitting a request for transmission pattern configuration to a base station, and, responsive to the request, receiving from the base station information indicating which one of the multiple different transmission patterns the user equipment is to be configured with.

4. The method of claim 3, wherein the request indicates in which of the plurality of different restricted areas of the cell the user equipment is located.

5. The method of claim 1, wherein the different transmission patterns are different almost blank subframe patterns.

6. The method of claim 1, wherein the different transmission patterns are different patterns for radio resource management (RRM) or radio link monitoring (RLM).

7. The method of claim 1, wherein the different transmission patterns include:
    a first pattern comprised of Multicast Broadcast Single Frequency Networks (MBSFN) subframes; and
    a second pattern comprised of non-MBSFN almost blank subframes or a mix of blank subframes with different properties.

8. A user equipment configured for use in a wireless communication system, the user equipment comprising: a processing circuit and a memory, the memory containing instructions executable by the processing circuit whereby the user equipment is configured to:
    receive, for each of a plurality of different restricted areas of a cell, a respective one of multiple different transmission patterns that is to be used in the different restricted area, wherein:
        the multiple different transmission patterns comprise different patterns of resources in time which are usable for performing radio measurements;
        each of the different restricted areas of the cell is smaller than an entire area of the cell; and
        the multiple different transmission patterns comprise no transmission of a specific reference signal; and
    receive using a transmission pattern of the multiple different transmission patterns.

9. The user equipment of claim 8, wherein the memory contains instructions executable by the processing circuit whereby the user equipment is further configured to determine which one of the multiple different transmission patterns the user equipment is to be configured to be performed with, based on in which of the plurality of different restricted areas of the cell the user equipment is located.

10. The user equipment of claim 8, wherein the memory contains instructions executable by the processing circuit whereby the user equipment is further configured to transmit a request for transmission pattern configuration to a base station, and, responsive to the request, receive from the base station information indicating which one of the multiple different transmission patterns the user equipment is to be configured to be performed with.

11. The user equipment of claim 10, wherein the request indicates in which of the plurality of different restricted areas of the cell the user equipment is located.

12. The user equipment of claim 8, wherein the different transmission patterns are different almost blank subframe patterns.

13. The user equipment of claim 8, wherein the different transmission patterns are different patterns for radio resource management (RRM) or radio link monitoring (RLM).

14. A non-transitory computer readable storage medium comprising instructions that, when executed by a processor of a user equipment, causes the user equipment to:
    receive, for each of a plurality of different restricted areas of a cell, a respective one of multiple different transmission patterns that is to be used in the different restricted area, wherein:
        the multiple different transmission patterns comprise different patterns of resources in time which are usable for performing radio measurements;
        each of the different restricted areas of the cell is smaller than an entire area of the cell; and
        the multiple different transmission patterns comprise no transmission of a specific reference signal; and
    receive using a transmission pattern of the multiple different transmission patterns.

15. The method of claim 1, wherein the multiple different transmission patterns comprise at least a first transmission pattern that defines resources in time that are exclusively to be used for measurements by any user equipment served by the cell located in a first restricted area of the multiple different restricted areas and are not to be used by user equipment located in other restricted areas of the multiple different restricted areas.

16. A method performed by a network node in a wireless communication system, the method comprising:

transmitting, for each of a plurality of different restricted areas of a cell, a respective one of multiple different transmission patterns that is to be used in the different restricted area, wherein:

the multiple different transmission patterns comprise different patterns of resources in time which are usable for performing radio measurements by a user equipment;

each of the different restricted areas of the cell is smaller than an entire area of the cell; and the multiple different transmission patterns comprise no transmission of a specific reference signal; and transmitting using a transmission pattern of the multiple different transmission patterns.

17. A network node configured for use in a wireless communication system, the network node comprising: a processing circuit and a memory, the memory containing instructions executable by the processing circuit whereby the network node is configured to:

transmit, for each of a plurality of different restricted areas of a cell, a respective one of multiple different transmission patterns that is to be used in the different restricted area, wherein:

the multiple different transmission patterns comprise different patterns of resources in time which are usable for performing radio measurements by a user equipment;

each of the different restricted areas of the cell is smaller than an entire area of the cell; and the multiple different patterns comprise no transmission of a specific reference signal; and transmit using a transmission pattern of the multiple different transmission patterns.

* * * * *